United States Patent
Mai et al.

(10) Patent No.: US 12,039,200 B2
(45) Date of Patent: Jul. 16, 2024

(54) LOAD BALANCING BETWEEN STORAGE DEVICES

(71) Applicant: SAMSUNG ELECTRONICS CO., LTD., Suwon-si (KR)

(72) Inventors: Dingbang Mai, Suwon-si (KR); Seok-Jae Han, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 17/877,311

(22) Filed: Jul. 29, 2022

(65) Prior Publication Data

US 2023/0069339 A1    Mar. 2, 2023

(30) Foreign Application Priority Data

Aug. 27, 2021 (KR) .......... 10-2021-0113583

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679
USPC .......................................... 711/154
See application file for complete search history.

(56) References Cited

U.S. PATENT DOCUMENTS

| | | | |
|---|---|---|---|
| 8,924,645 B2* | 12/2014 | Chang | G06F 1/3268 711/E12.017 |
| 10,108,654 B2 | 10/2018 | Abbour et al. | |
| 2006/0212333 A1 | 9/2006 | Jackson | |
| 2013/0198449 A1 | 8/2013 | Belluomini et al. | |
| 2014/0052892 A1 | 2/2014 | Klein et al. | |
| 2015/0326656 A1 | 11/2015 | Guo et al. | |
| 2020/0125495 A1* | 4/2020 | Galbi | G06F 12/0804 |
| 2021/0042228 A1* | 2/2021 | Herdrich | G06F 12/0895 |
| 2021/0243247 A1* | 8/2021 | He | H04L 67/63 |
| 2022/0247696 A1* | 8/2022 | He | H04L 49/9057 |
| 2023/0004324 A1 | 1/2023 | Lim et al. | |

FOREIGN PATENT DOCUMENTS

| | | |
|---|---|---|
| KR | 10-1840238 B1 | 3/2018 |
| KR | 20230005628 | 1/2023 |

* cited by examiner

*Primary Examiner* — Than Nguyen
(74) *Attorney, Agent, or Firm* — Fish & Richardson P.C.

(57) ABSTRACT

Disclosed is a storage device which includes a nonvolatile memory device, a buffer memory, a port that is connected with an external device, and a storage controller. When a command received from the external device through the port corresponds to a first packet format, the storage controller accesses the nonvolatile memory device by using the buffer memory in response to the command. When the command received from the external device through the port corresponds to a second packet format, the storage controller accesses the buffer memory without accessing the nonvolatile memory device in response to the command.

15 Claims, 18 Drawing Sheets

LOAD BALANCING BETWEEN STORAGE DEVICES

CROSS-REFERENCE TO RELATED APPLICATIONS

This application claims priority under 35 U.S.C. § 119 to Korean Patent Application No. 10-2021-0113583 filed on Aug. 27, 2021, in the Korean Intellectual Property Office, the disclosure of which is incorporated by reference herein in its entirety.

BACKGROUND

Embodiments of the present disclosure described herein relate to an electronic device, and more particularly, relate to a computational storage device that performs load balancing.

An electronic device, which processes large amounts of data, such as a server, may be equipped with a plurality of processors, a plurality of main memories, and storage devices. Because an electronic device such as a server processes a large amount of data, data processing (e.g., a computational operation) such as encryption, decryption, compression, and decompression may demand a lot of resources (e.g., a computational operations, power, and time).

To reduce the large resource consumption of the server, a computational storage device that instead performs and/or processes tasks of processors of the server is being studied. The processors may delegate tasks supported by the computational storage device to the computational storage device. Accordingly, the resource consumption of the processors may be reduced, and latencies of processors may be reduced.

SUMMARY

Exemplary embodiments of the present disclosure provide a storage device supporting load balancing between computational storage devices with respect to tasks delegated from processors of an electronic device without imposing such overhead on the processors, an electronic device including the storage device, and an operating method of the electronic device are disclosed.

According to an exemplary embodiment, a storage device includes a nonvolatile memory device, a buffer memory, a port that is connected with an external device, and a storage controller. When a command received from the external device through the port corresponds to a first packet format, the storage controller accesses the nonvolatile memory device by using the buffer memory in response to the command. When the command received from the external device through the port corresponds to a second packet format, the storage controller accesses the buffer memory without an access to the nonvolatile memory device in response to the command.

According to an exemplary embodiment, an electronic device includes at least one processor, a first storage device and a second storage device each of which includes a buffer memory and a nonvolatile memory device, a root complex that electrically connects the at least one processor, the first storage device, and the second storage device. Each of the first storage device and the second storage device accesses the nonvolatile memory device by using the buffer memory in response to a command of a first packet format that is received from the at least one processor through the root complex and accesses the buffer memory without an access to the nonvolatile memory device in response to a command of a second packet format that is received from the at least one processor through the root complex.

According to an exemplary embodiment, an operating method of an electronic device which includes at least one processor, a first storage device, a second storage device, and a root complex includes assigning, at the at least one processor, a first task and a second task to the first storage device and the second storage device through the root complex based on a first packet format, respectively, monitoring, the at least one processor, a computational utilization rate of the first storage device and a computational utilization rate of the second storage device through the root complex, instructing, the at least one processor, to balance the first storage device and the second storage device through the root complex based on a second packet format when a difference between the computational utilization rate of the first storage device and the computational utilization rate of the second storage device is greater than a first threshold value, and performing, at the first storage device and the second storage device, such balancing through the root complex without passing through the at least one processor.

BRIEF DESCRIPTION OF THE DRAWINGS

The above and other objects and features of the present disclosure will become apparent by detailed description of exemplary embodiments thereof with reference to the accompanying drawings.

DETAILED DESCRIPTION

Below, exemplary embodiments of the present disclosure will be described in such detail and clarity, that a person of skill in the art may easily implement the present invention. Below, the term "and/or" is interpreted as including any one of items listed with regard to the term, at least one of the listed items, a combination of some of the listed items, or a combination of all the listed items.

Figure 1:
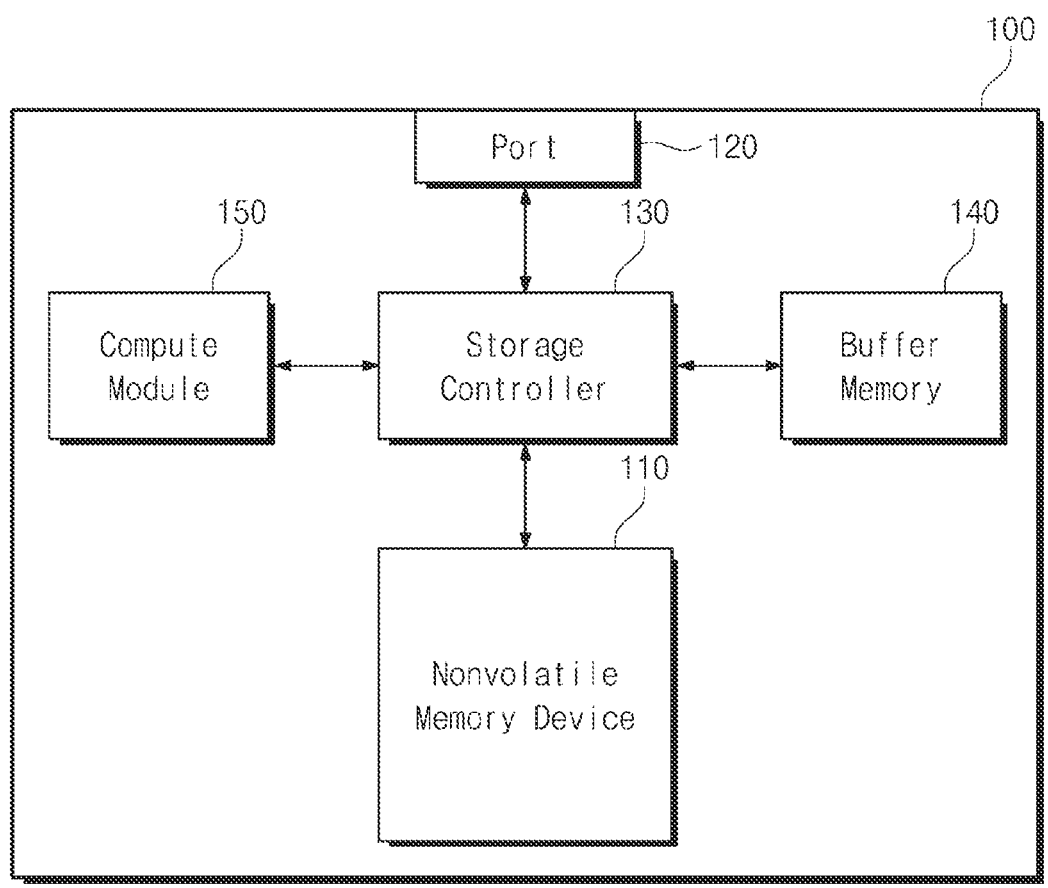
FIG. 1 illustrates a storage device according to an exemplary embodiment of the present disclosure.

FIG. 1 illustrates a storage device 100 according to an exemplary embodiment of the present disclosure. Referring to FIG. 1, the storage device 100 may include a nonvolatile memory device 110, a port 120, a storage controller 130, a buffer memory 140, and a compute module 150.

The nonvolatile memory device 110 may operate under control of the storage controller 130. Even though its power may be off, the nonvolatile memory device 110 may store data. The nonvolatile memory device 110 may be implemented in various types of memories such as a flash memory, a phase change memory, a ferroelectric memory, a magnetic memory, and a resistive memory.

The port 120 may communicate with an external device. The port 120 may receive a command or data from the external device. The port 120 may transmit a response, an interrupt, or data to the external device. For example, the port 120 may be implemented to operate based on PCIe (Peripheral Component Interconnect)© or NVMe (Non-Volatile Memory express)™.

The storage controller 130 may drive firmware or software that controls and manages the storage device 100. The storage controller 130 may receive a command or data from the external device through port 120. The storage controller 130 may access the nonvolatile memory device 110, the buffer memory 140, or the compute module 150, in response to the command provided from the external device or based on a schedule that is internally determined by the firmware or software driving storage device 100.

The storage controller 130 may transmit a response to the command received from the external device through the port 120 or a result of accessing the nonvolatile memory device 110, the buffer memory 140, or the compute module 150, to the external device through the port 120. The storage controller 130 may transmit status information, an interrupt, or the like to the external device through the port 120.

The buffer memory 140 may operate under control of the storage controller 130. The buffer memory 140 may include a random access memory. For example, the buffer memory 140 may be implemented with a dynamic random access memory, a static random access memory, a phase change random access memory, a ferroelectric random access memory, a magnetic random access memory, a resistive random access memory, or the like.

The buffer memory 140 may perform a buffering operation by temporarily storing data to be written in the nonvolatile memory device 110 or data read from the nonvolatile memory device 110. The buffer memory 140 may be used as a working memory that stores data to be processed by the compute module 150 or data processed by the compute module 150. The buffer memory 140 may be used as a system memory that stores metadata to be used by the storage controller 130.

The compute module 150 may operate under control of the storage controller 130. The compute module 150 may perform at least one operation with respect to data stored in the buffer memory 140, for example, data transferred to the compute module 150 after being read from the buffer memory 140 by the storage controller 130. The at least one operation may include encryption, decryption, compression, decompression, database filtering, image processing, multiplication, addition, multiply-accumulate, and neural network inference or classification. The database filtering may include retrieving data that includes or does not include a specific word.

The compute module 150 may be implemented to include at least one of an encryption and decryption unit, a compressor and decompressor, a neural processor, a neuromorphic processor, a graphics processing unit (GPU), an image processor, a digital signal processor (DSP), an application specific integrated circuit (ASIC), a field programmable gate array (FPGA), a multiplier, an adder, a multiplier and accumulator (MAC), a floating point unit (FPU), and a database filter.

The compute module 150 may include two or more homogeneous or heterogeneous parallel or serial submodules. The compute module 150 may perform an operation by using some or all of the two or more submodules.

The storage device 100 may perform tasks delegated from the external device by using the compute module 150. For example, the storage device 100 may be implemented with a computational storage device (CSD).

Figure 2:
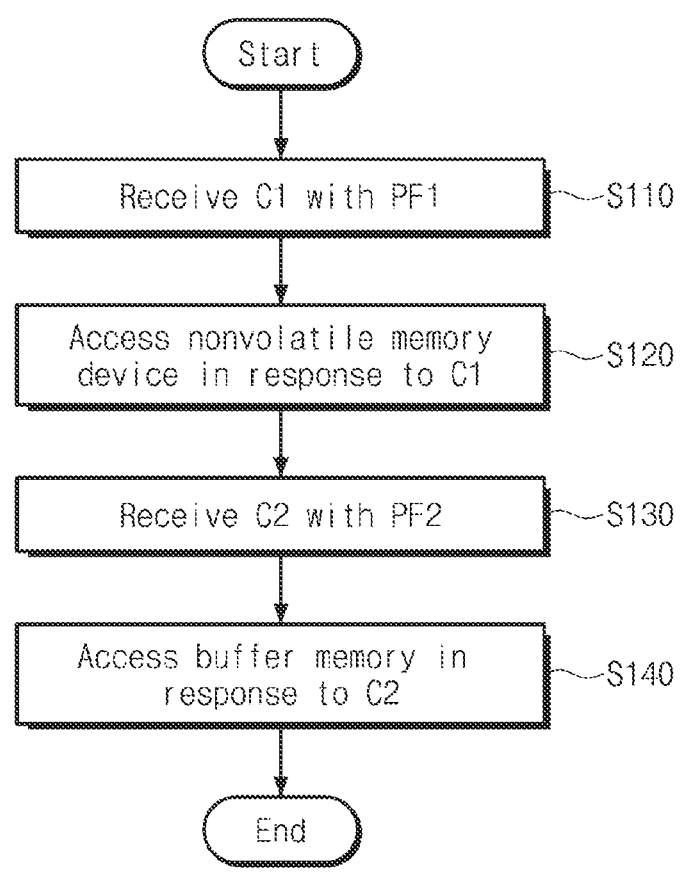
FIG. 2 illustrates an example of an operating method of a storage device according to an exemplary embodiment of the present disclosure.

FIG. 2 illustrates an example of an operating method of the storage device 100 according to an exemplary embodiment of the present disclosure. Referring to FIGS. 1 and 2, in operation S110, the storage controller 130 of the storage device 100 may receive a first command C1 corresponding to a first packet format PF1 from the external device through the port 120. For example, the first packet format PF1 may correspond to a PCIe© or NVMe™.

In operation S120, the storage controller 130 may access the nonvolatile memory device 110 in response to the first command C1. For example, the storage controller 130 may access the nonvolatile memory device 110 through the buffer memory 140 (e.g., through buffering) or may directly access the nonvolatile memory device 110 without passing through the buffer memory 140 (without buffering). The access to the nonvolatile memory device 110 may include a write operation or a read operation.

In operation S130, the storage controller 130 of the storage device 100 may receive a second command C2 corresponding to a second packet format PF2 from the external device through the port 120. For example, the second packet format PF2 may correspond to CXL (Compute eXpress Link)™.

In operation S140, the storage controller 130 may access the buffer memory 140 in response to the second command C2. The access to the buffer memory 140 may include a write operation or a read operation. For example, the storage controller 130 may access the buffer memory 140 without accessing the nonvolatile memory device 110.

In an exemplary embodiment, the first command C1 corresponding to the first packet format PF1 may selectively include information about the compute module 150 such as an operation code opcode, a descriptor, or an argument. In response to the information about the compute module 150, the storage controller 130 may allow the compute module 150 to perform at least one operation with respect to data loaded onto the buffer memory 140 after being received from an external host device through the port 120 or data loaded on the buffer memory 140 after being read from the nonvolatile memory device 110.

As described above, the storage device 100 may support an operation of the compute module 150, which is associated with the data loaded onto the buffer memory 140, depending on the first command C1 corresponding to the first packet format PF1. Accordingly, the storage device 100 may be implemented with the computational storage device (CSD). The storage device 100 may exchange the data loaded onto the buffer memory 140 with the external device, depending on the second command C2 corresponding to the second packet format PF2. Accordingly, the storage device 100 may be implemented to support balancing (e.g., balancing of an operational load) capable of distributing and performing the operation of the compute module 150 with the external device.

Figure 3:
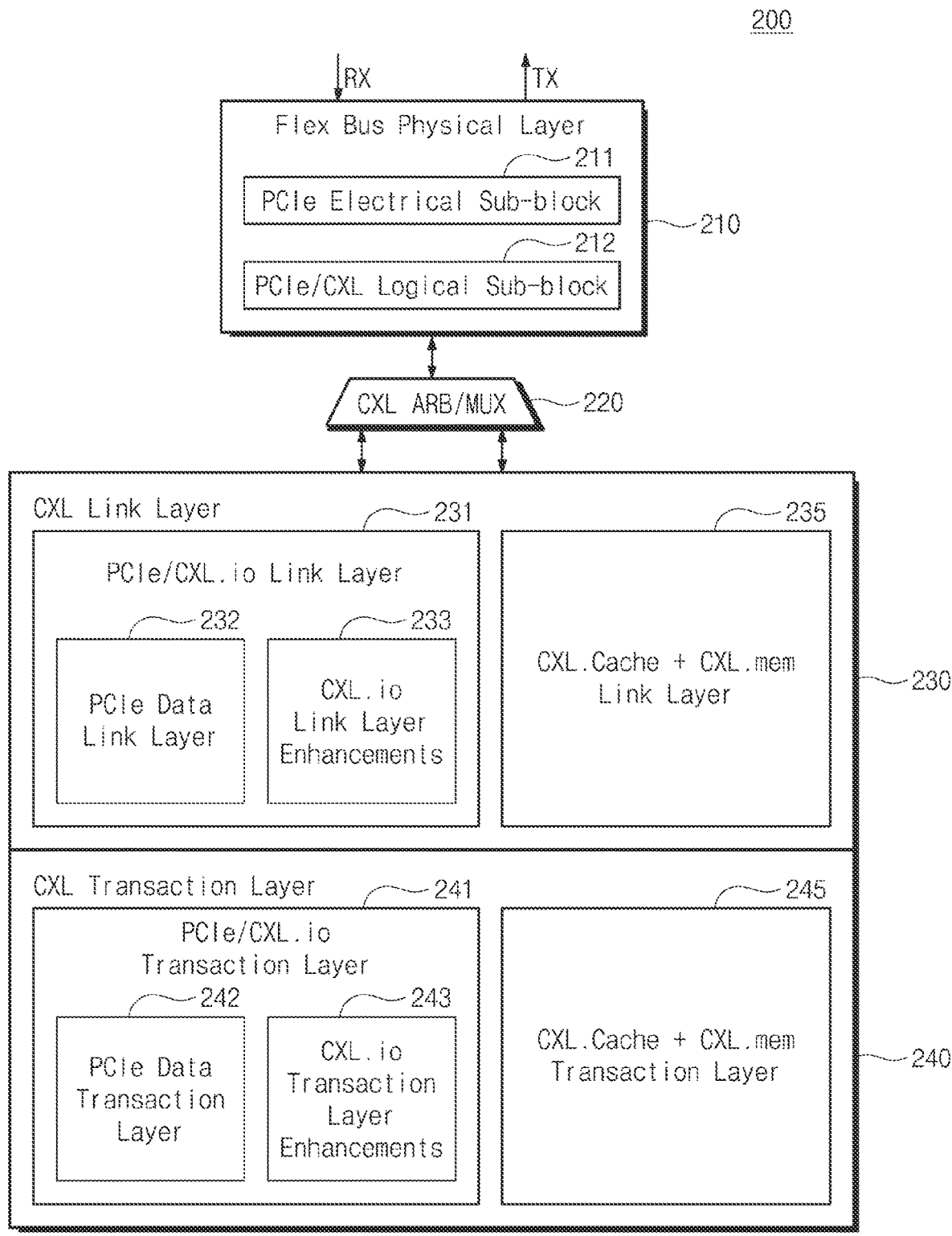
FIG. 3 illustrates a port according to an exemplary embodiment of the present disclosure.

FIG. 3 illustrates a port 200 according to an exemplary embodiment of the present disclosure. For example, the port 200 may correspond to an implementation example of the port 120 of FIG. 1. Referring to FIGS. 1 and 3, the port 200 may be implemented based on the CXL™. The port 200 may include a flex bus physical layer 210, a CXL arbiter/multiplexer (CXL ARB/MUX) 220, a CXL link layer 230, and a CXL transaction layer 240.

The flex bus physical layer 210 may include a PCIe electrical sub-block 211 and a PCIe/CXL logical sub-block 212. The PCIe electrical sub-block 211 may be used in common by the PCIe© and the CXL™. That is, electrical characteristics of the first command C1 corresponding to the first packet format PF1 may be identical to electrical characteristics of the second command C2 corresponding to the second packet format PF2.

The PCIe/CXL logical sub-block may enter a PCIe© mode in initial link training; in recovery defined by the PCIe©, depending on the mode negotiation, the PCIe/CXL logical sub-block 212 may enter a CXL™ mode or may be recovered to the PCIe© mode.

The CXL arbiter/multiplexer 220 may transfer a packet of the first packet format PF1 transferred from the flex bus physical layer 210 in the PCIe© mode or a packet of the second packet format PF2 associated with an input and output (io) in the CXL™ mode to a PCIe/CXL.io link layer 231 of the CXL link layer 230. The CXL arbiter/multiplexer 220 may transfer a packet of the second packet format PF2, which is associated with a cache and/or memory and is transferred from the flex bus physical layer 210 in the CXL™ mode, to a CXL.cache+CXL.mem link layer 235 of the CXL link layer 230.

The PCIe/CXL.io link layer 231 may include a PCIe data link layer 232 and a CXL.io link layer enhancements 233. The PCIe data link layer 232 may function as a data link layer in the PCIe© mode. The CXL.io link layer enhancements 233 may function as a data link layer associated with the input and output io in the CXL™ mode.

The CXL transaction layer 240 may function based on the CXL link layer 230. The CXL transaction layer 240 may include a PCIe/CXL.io transaction layer 241, and a CXL.Cache+CXL.mem transaction layer 245. The PCIe/CXL.io transaction layer 241 may include a PCIe data transaction layer 242 and a CXL.io transaction layer enhancements 243.

The PCIe data transaction layer 242 may function based on the PCIe data link layer 232. The CXL.io transaction layer enhancements 243 may function based on the CXL.io link layer enhancements 233. The CXL.Cache+CXL.mem transaction layer 245 may function based on the CXL.cache+CXL.mem link layer 235.

Figure 4:
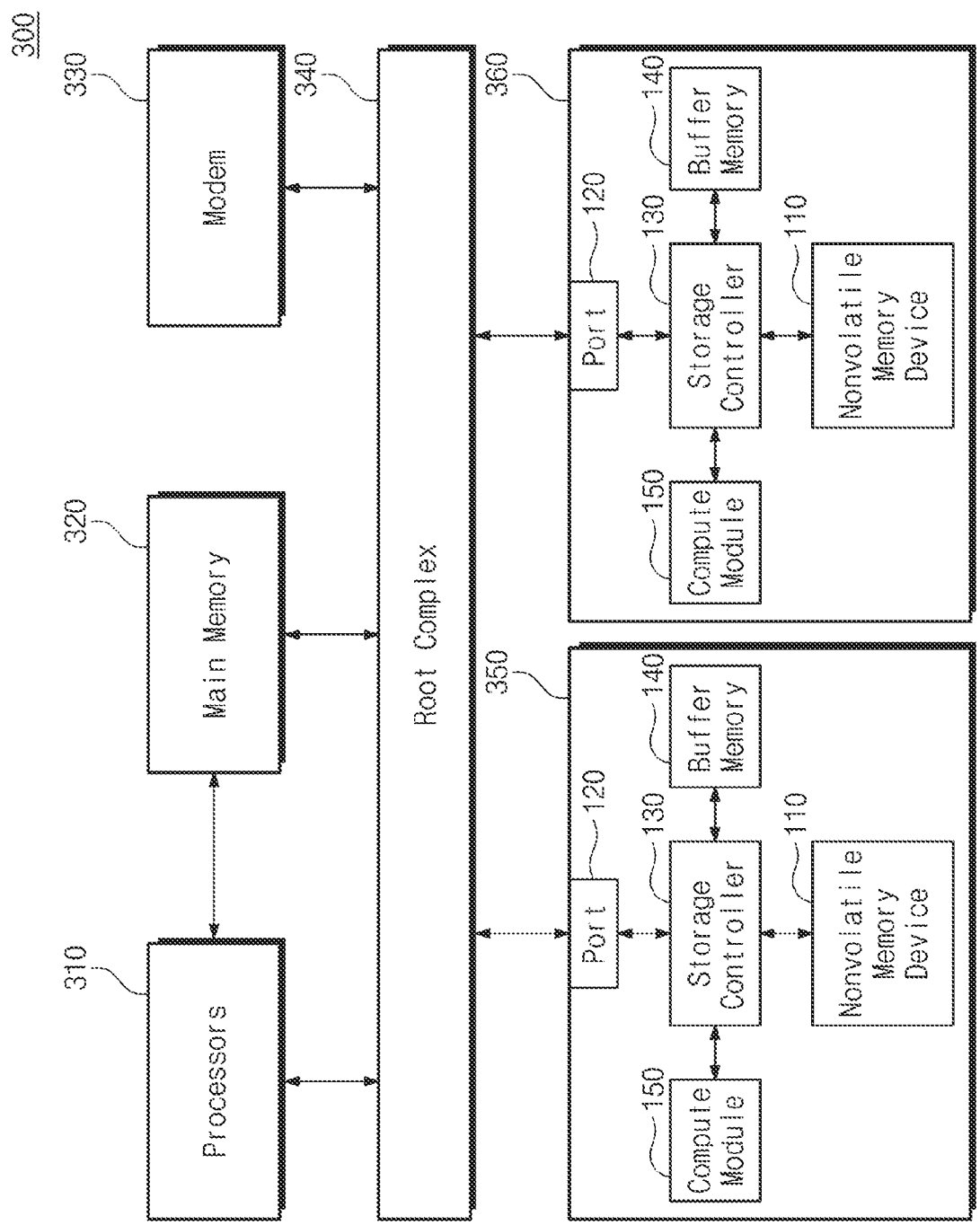
FIG. 4 illustrates an electronic device according to an exemplary embodiment of the present disclosure.

FIG. 4 illustrates an electronic device 300 according to an exemplary embodiment of the present disclosure. Referring to FIG. 4, the electronic device 300 may be implemented with a computing device or a server. The electronic device 300 may include processors 310, a main memory 320, a modem 330, a root complex 340, a first storage device 350, and a second storage device 360.

The processors 310 may include at least one main processor and at least one auxiliary processor. The at least one main processor may include a central processing unit (CPU) or an application processor (AP). The at least one auxiliary processor may include various processors or hardware accelerators such as a graphics processing unit (GPU), an image signal processor (ISP), a digital signal processor (DSP), a neural processor or neuromorphic processor (NP), a neural processing unit, or a neuromorphic processing unit (NPU).

The main memory 320 may be used with a system memory of the electronic device 300 and/or a working memory of the processors 310. The main memory 320 may include two or more homogeneous or heterogeneous memories. The main memory 320 may include at least one of various memories such as a static random access memory (SRAM), a dynamic random access memory (DRAM), a phase-change random access memory (PRAM), a magnetic random access memory (MRAM), a ferroelectric random access memory (FRAM), a resistive random access memory (RRAM), and a storage class memory (SCM).

The main memory 320 may directly communicate with the processors 310 and/or may communicate with any other component(s) of the electronic device 300 through the root complex 340. A communication protocol through which the main memory 320 communicates with the processors 310 may be identical to or different from a communication protocol through which the main memory 320 communicates with the root complex 340.

The modem 330 may communicate with the external device. The modem 330 may be implemented to communicate with the external device based on at least one of various wired or wireless communication protocols. The modem 330 may transfer data received from the external device to the processors 310 or the main memory 320 through the root complex 340. The modem 330 may transmit, to the external device, data received from the processors 310 or the main memory 320 through the root complex 340.

The root complex 340 may electrically and/or communicatively connect the processors 310 and/or the main memory 320 with any other component(s) (for example, including the modem 330, the first storage device 350, and the second storage device 360) of the electronic device 300. Alternatively, the root complex 340 may electrically and/or communicatively connect any other components (for example, including the modem 330, the first storage device 350, and the second storage device 360) of the electronic device 300.

The root complex 340 may arbitrate communication of the processors 310 and/or the main memory 320 with any other component(s) (for example, including the modem 330, the first storage device 350, and the second storage device 360) of the electronic device 300. Alternatively, the root complex 340 may arbitrate communication between any other components (for example, including the modem 330, the first storage device 350, and the second storage device 360) of the electronic device 300.

The first storage device 350 and the second storage device 360 may be connected with the root complex 340. Each of the first storage device 350 and the second storage device 360 may correspond to the storage device 100 of FIG. 1. For example, each of the first storage device 350 and the second storage device 360 may include the nonvolatile memory device 110, the port 120, the storage controller 130, the buffer memory 140, and the compute module 150.

As described with reference to FIG. 2, in response to the first command C1 of the first packet format PF1 received from the processors 310, the storage controller 130 of the first storage device 350 or the second storage device 360 may access the nonvolatile memory device 110 by using the buffer memory 140. In response to the second command C2 of the second packet format PF2 received from the processors 310, the storage controller 130 of the first storage device 350 or the second storage device 360 may access the buffer memory 140.

Figure 5:
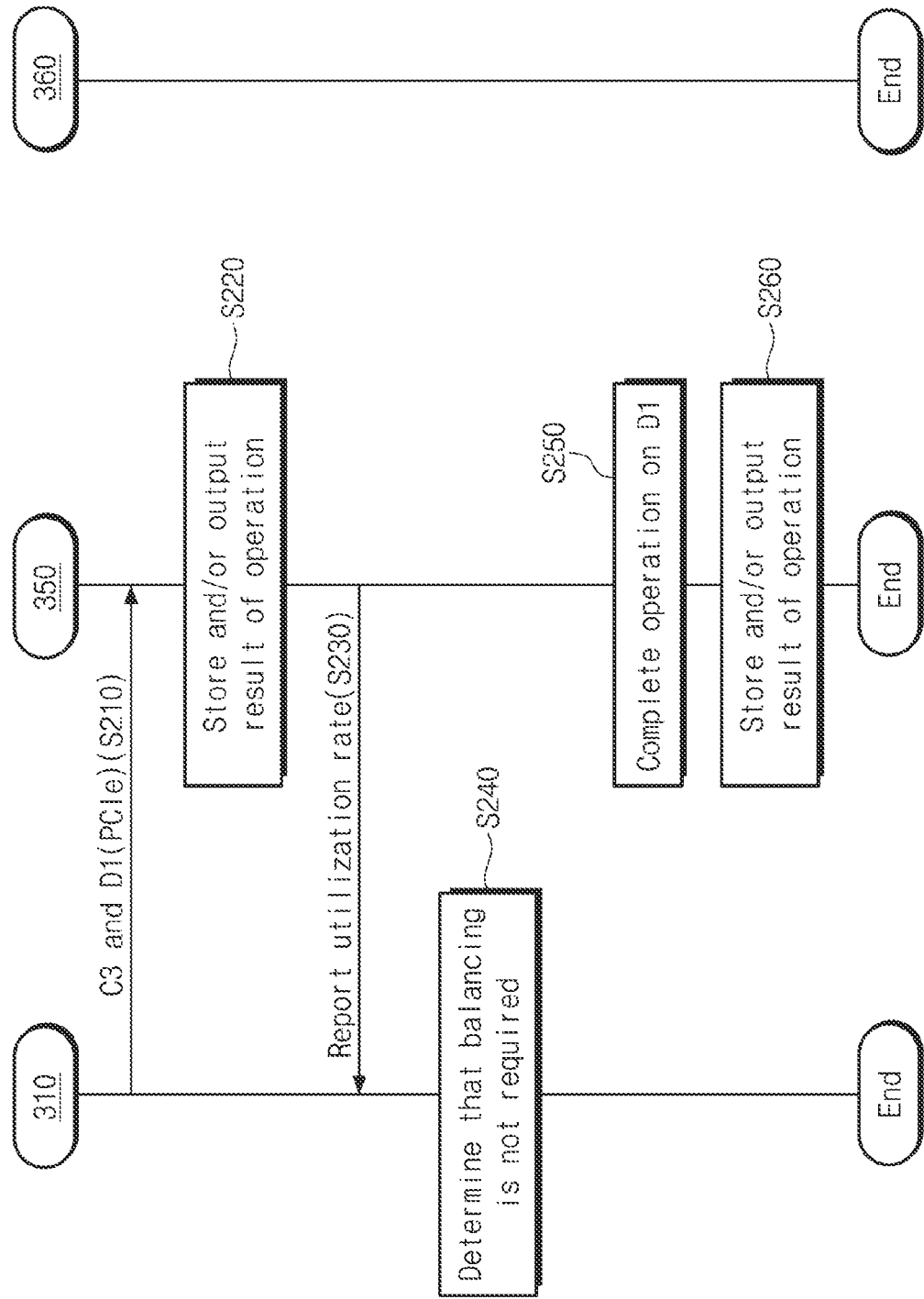
FIG. 5 illustrates a first example of an operating method of an electronic device.
Figure 6:
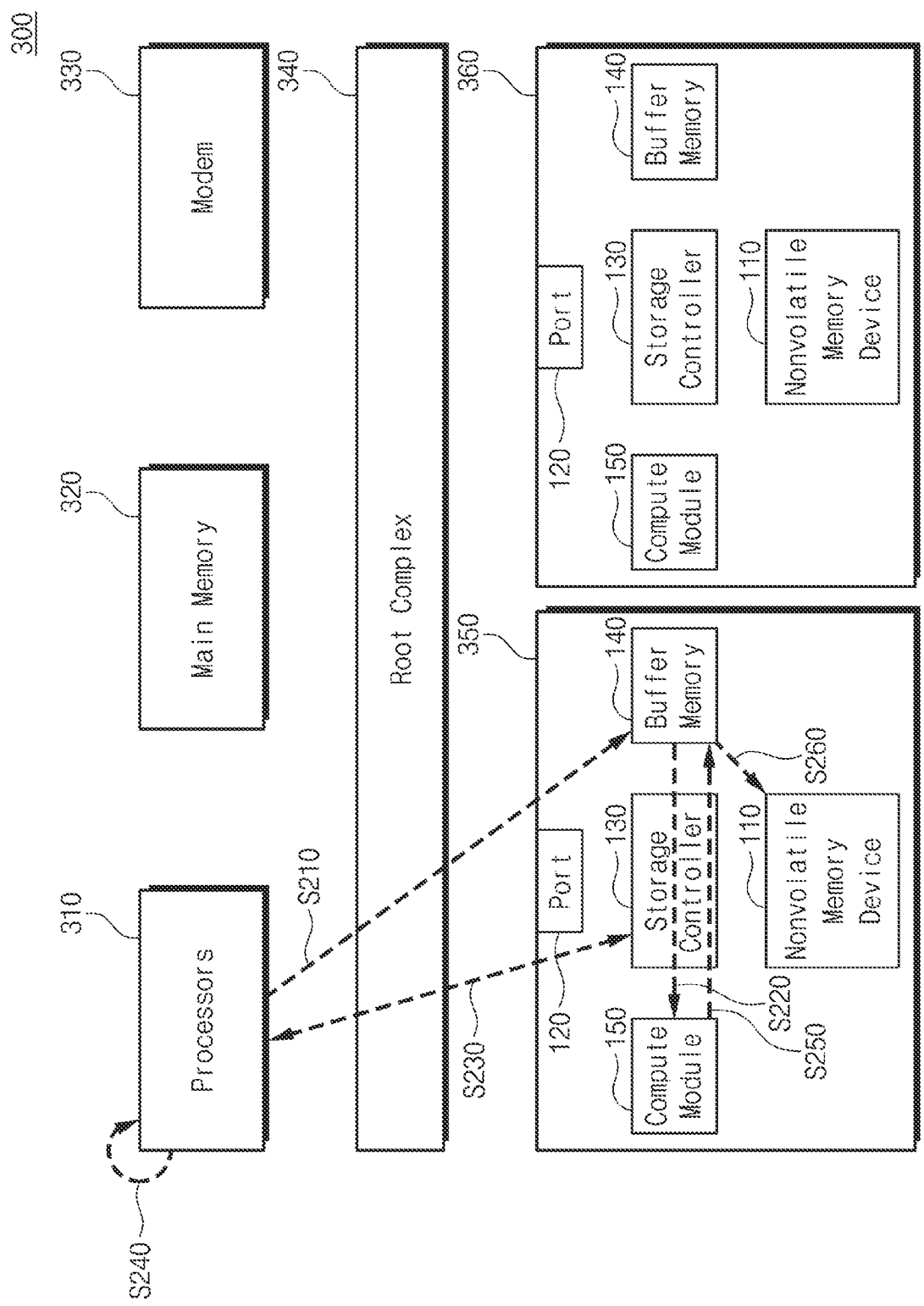
FIG. 6 illustrates an example of a process in which an operation according to the operating method of FIG. 5 is performed in an electronic device of FIG. 4.

FIG. 5 illustrates a first example of an operating method of the electronic device 300. FIG. 6 illustrates an example of a process in which an operation according to the operating method of FIG. 5 is performed in the electronic device 300 of FIG. 4. Referring to FIGS. 5 and 6, in operation S210, the first storage device 350 may receive a third command C3 and first data D1 from the processors 310. The third command C3 may have a first packet format, for example, a packet format of the PCIe©.

The third command C3 may be a command for the first data D1, for example, a write and/or compute command. The details of the operation that the third command C3 indicates may be defined by a detailed information field of the third command C3, such as an operation code opcode of the third command C3, a descriptor of the third command C3, and/or an argument of the third command C3. The third command C3 and the first data D1 may be transferred from the processors 310 to the storage controller 130 through the root complex 340 and the port 120. The storage controller 130 may store (or load) the first data D1 in (or onto) the buffer memory 140.

In operation S220, the first storage device 350 may start an operation (e.g., at least one computation/calculation/operation) associated with the first data D1 in response to the third command C3. The storage controller 130 may transfer the data stored in (or loaded onto) the buffer memory 140 to the compute module 150 based on an operation unit of the compute module 150. The compute module 150 may perform at least one operation indicated by the third command C3 with respect to the data of the operation unit transferred from the storage controller 130. The storage controller 130 may store (or load) a result of the operation performed by the compute module 150 in (or onto) the buffer memory 140.

The storage controller 130 may perform an operation on the first data D1 by repeating an operation of controlling the buffer memory 140 and the compute module 150 so as to repeat the following: 1) an operation of transferring, to the compute module 150, data corresponding to the operation unit from among the data loaded onto the buffer memory 140, 2) an operation of allowing the compute module 150 to perform an operation on (or to process) the data of the operation unit, and 3) an operation of storing (or loading) a result of the operation performed by the compute module 150 in (or onto) the buffer memory 140.

In operation S230, the first storage device 350 may report a utilization rate to the processors 310. For example, the storage controller 130 may monitor the utilization rate of the compute module 150. The storage controller 130 may report the utilization rate of the compute module 150 to the processors 310 through the port 120 and the root complex 340 (e.g., in the form of an interrupt), (i) after the compute module 150 starts an operation, (ii) after the compute module 150 starts the operation and then after a specific time passes, (iii) in response to that the compute module 150 starts the operation and a change of the utilization rate of the compute module 150 is saturated to a threshold value or less, and/or (iv) periodically based on a specific period (e.g., a time period).

Alternatively, the processors 310 request (or direct) the first storage device 350 to report the utilization rate of the compute module 150 through the root complex 340, by polling the utilization rate of the compute module 150 to the first storage device 350 after transmitting the third command C3 to the first storage device 350, after a specific time passes from the transmission of the third command C3 to the first storage device 350, and/or periodically based on a specific period (e.g., a time period).

In operation S240, the processors 310 may determine that balancing (e.g., balancing of an operation load) is not required. For example, the processors 310 may monitor the utilization rate(s) of the first storage device 350 and/or the second storage device 360 and may determine that balancing is not required, depending on a monitoring result. If it is determined that the balancing is not required, the processors 310 may not request the balancing from the first storage device 350 and the second storage device 360.

In operation S250, the first storage device 350 may complete the operation associated with the first data D1. For example, the storage controller 130 of the first storage device 350 may complete the operation associated with the first data D1 by repeating the operation, which is based on the operation unit described with reference to operation S220, with respect to the data loaded onto the buffer memory 140.

In operation S260, the first storage device 350 may store and/or output a result of the operation. For example, the storage controller 130 of the first storage device 350 may store the operation result stored in (or loaded onto) the buffer memory 140 in the nonvolatile memory device 110 and/or may output the operation result to the processors 310 through the port 120 and the root complex 340 (e.g., based on the first packet format PF1).

As operation S210 to operation S260 are performed, the process in which the processors 310 of the electronic device 300 delegate and process at least one computation/calculation/operation to the first storage device 350 may be completed.

Figure 7:
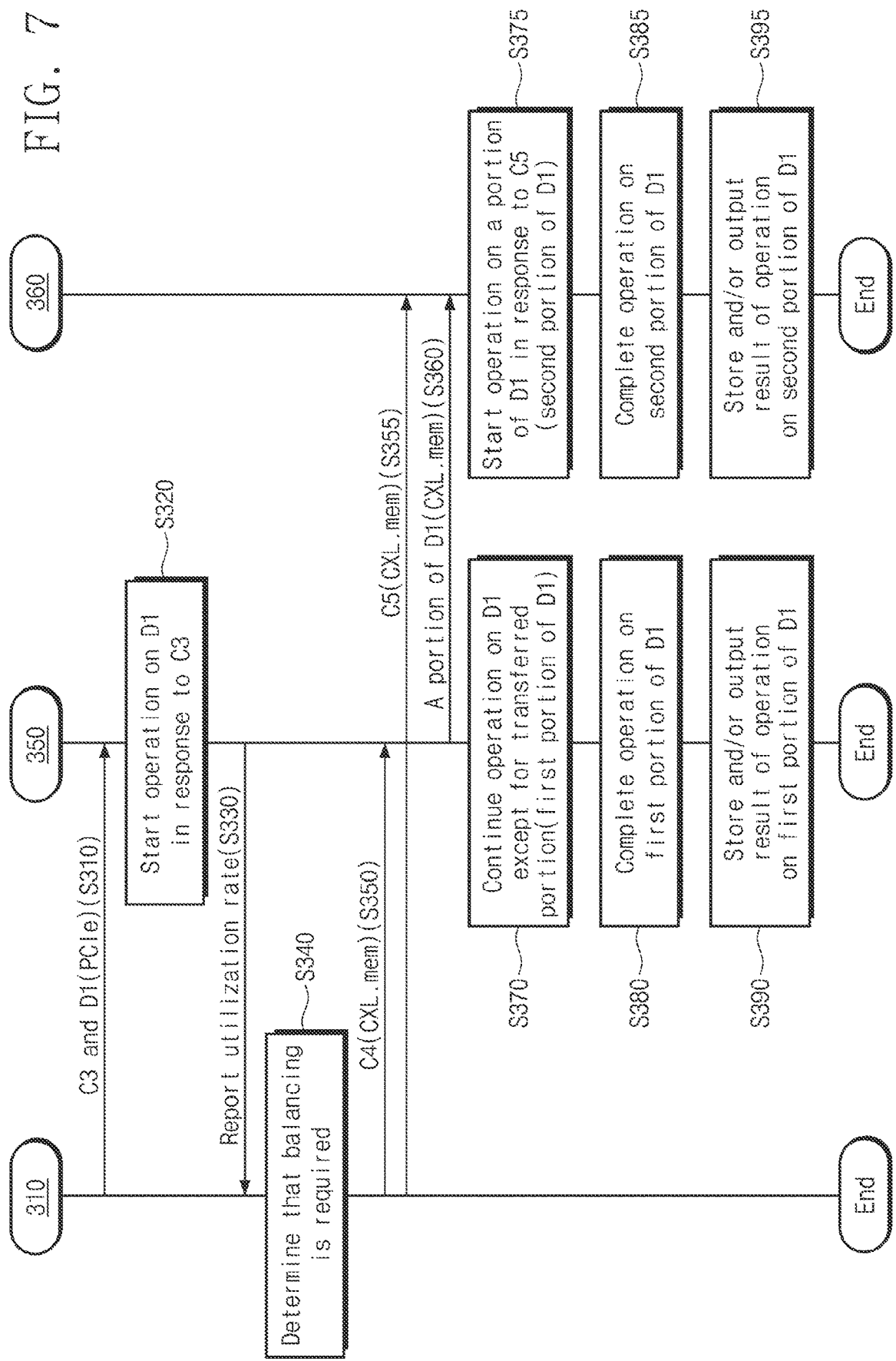
FIG. 7 illustrates a second example of an operating method of an electronic device.
Figure 8:
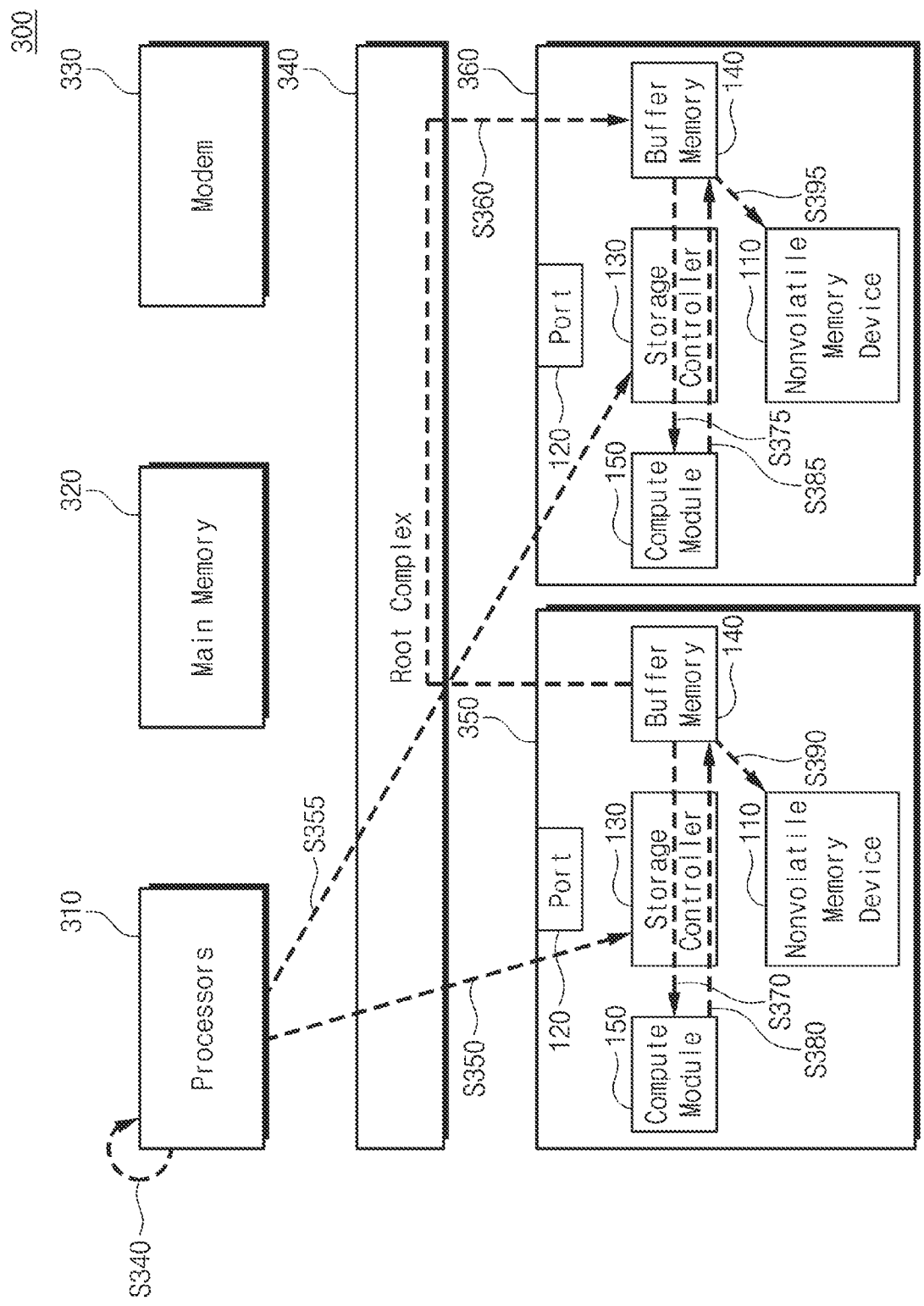
FIG. 8 illustrates an example of a process in which an operation according to the operating method of FIG. 7 is performed in an electronic device of FIG. 4.

FIG. 7 illustrates a second example of an operating method of the electronic device 300. FIG. 8 illustrates an example of a process in which an operation according to the operating method of FIG. 7 is performed in the electronic device 300 of FIG. 4. Referring to FIGS. 7 and 8, in operation S310, the first storage device 350 may receive the third command C3 and the first data D1 from the processors 310. In operation S320, the first storage device 350 may start an operation (e.g., at least one computation/calculation/operation) associated with the first data D1 in response to the third command C3. In operation S330, the first storage device 350 may report a utilization rate to the processors 310. Operation S310 to operation S330 may be performed to be the same as operation S210 to operation S230. Thus, additional description associated with operation S310 to operation S330 will be omitted to avoid redundancy.

In operation S340, the processors 310 may determine that balancing (e.g., balancing of an operation load) is required. For example, the processors 310 may monitor the utilization rate(s) of the first storage device 350 and/or the second storage device 360 and may determine that balancing is required, depending on a monitoring result.

If it is determined that the balancing is required, the processors 310 may request the balancing from the first storage device 350 and the second storage device 360. For example, in operation S350, the processors 310 may transmit, to the first storage device 350, a fourth command C4 having a second packet format, that is, the packet format of the CXL™ (or a packet format associated with "CXL.mem" from among packet formats of the CXL™). The fourth command C4 may be transferred to the storage controller 130 through the root complex 340 and the port 120. The fourth command C4 may include information for requesting (or directing) the transmission of a segment of data (e.g., the first data D1) specified as a target of the operation corresponding to the third command C3 to the second storage device 360 through the root complex 340.

In operation S355, the processors 310 may transmit, to the second storage device 360, a fifth command C5 having the second packet format, that is, the packet format of the CXL™ (or the packet format associated with "CXL.mem" from among the packet formats of the CXL™). The fifth command C5 may be transferred to the storage controller 130 through the root complex 340 and the port 120. The fifth command C5 may include information for requesting (or directing) to store (or load) the data transferred from the first storage device 350 through the root complex 340 in (onto) the buffer memory 140 of the second storage device 360.

In operation S360, the storage controller 130 of the first storage device 350 may transfer partial data, which are specified by the fourth command C4, from among the first data D1 loaded onto the buffer memory 140 to the root complex 340 through the port 120. For example, the partial data of the first data D1 may be transferred to the root complex 340 through at least one packet of the second packet format PF2. The root complex 340 may transfer the data packet of the second packet format PF2 transferred from the first storage device 350 to the second storage device 360. The storage controller 130 of the second storage device 360 may store (or load) the data included in the data packet received from the root complex 340 through the port 120 in (or onto) the buffer memory 140.

In operation S370, the first storage device 350 may continue the operation, which is based on the operation unit, with respect to the remaining data of the first data D1 other than the transmitted partial data (or segment), for example, first partial data of the first data D1. In operation S375, the second storage device 360 may start the operation, which is based on the operation unit, with respect to the transmitted partial data (or segment) of the first data D1, for example, second partial data of the first data D1.

In operation S380, the first storage device 350 may complete the operation associated with the first partial data of the first data D1. For example, the storage controller 130 of the first storage device 350 may complete the operation associated with the first partial data by repeating the operation, which is based on the operation unit described with reference to operation S220, with respect to the first partial data loaded onto the buffer memory 140. In operation S385, the second storage device 360 may complete the operation associated with the second partial data of the first data D1. For example, the storage controller 130 of the second storage device 360 may complete the operation associated with the second partial data by repeating the operation, which is based on the operation unit described with reference to operation S220, with respect to the second partial data loaded onto the buffer memory 140.

In operation S390, the first storage device 350 may store and/or output a result of the operation associated with the first partial data. For example, the storage controller 130 of the first storage device 350 may store the operation result of the first partial data stored in (or loaded onto) the buffer memory 140 in the nonvolatile memory device 110 and/or may output the operation result to the processors 310 through the port 120 and the root complex 340 (e.g., based on the first packet format PF1).

In operation S395, the second storage device 360 may store and/or output a result of the operation associated with the second partial data. For example, the storage controller 130 of the second storage device 360 may store the operation result of the second partial data stored in (or loaded onto) the buffer memory 140 in the nonvolatile memory device 110 and/or may output (or return) the operation result to the processors 310 through the port 120 and the root complex 340 (e.g., based on the first packet format PF1) and/or to the first storage device 350 (e.g., through the second packet format PF2).

As operation S310 to operation S395 are performed, the process in which the processors 310 of the electronic device 300 delegate, distribute, and process at least one computation/calculation/operation to the first storage device 350 and the second storage device 360 may be completed.

As described above, the first data D1 may be distributed into the first storage device 350 and the second storage device 360 through at least one packet of the second packet format PF2. Each of the first storage device 350 and the second storage device 360 may perform the operation with respect to data distributed thereto, and thus, the balancing of the operation load may be performed. In the process of performing the balancing of the operation load, any other operation other than an operation of issuing the fourth command C4 and the fifth command C5 of the second packet format PF2 may not be requested from the processors 310. Accordingly, the first storage device 350 and the second storage device 360 may support a function of balancing and processing at least one computation/calculation/operation without causing the overhead of the processors 310.

In an exemplary embodiment, the description is given as the processors 310 allows the second storage device 360 to perform the balancing of the operation load by transmitting, to the second storage device 360, the fifth command C5 having the second packet format, that is, the packet format of the CXL™ (or the packet format associated with "CXL.mem" from any of the packet formats of the CXL™) in operation S355. However, the fifth command C5 may be a command causing the forwarding of the second partial data. The processors 310 may transfer an additional command of the first packet format PF1 and/or the second packet format PF2 to the second storage device 360. The additional command may be a command that allows the second storage device 360 to perform at least one operation with respect to the second partial data thus forwarded. The additional command may be transferred from the processors 310 to the second storage device 360 after operation S355, before operation S360, and/or after operation S360.

Figure 9:
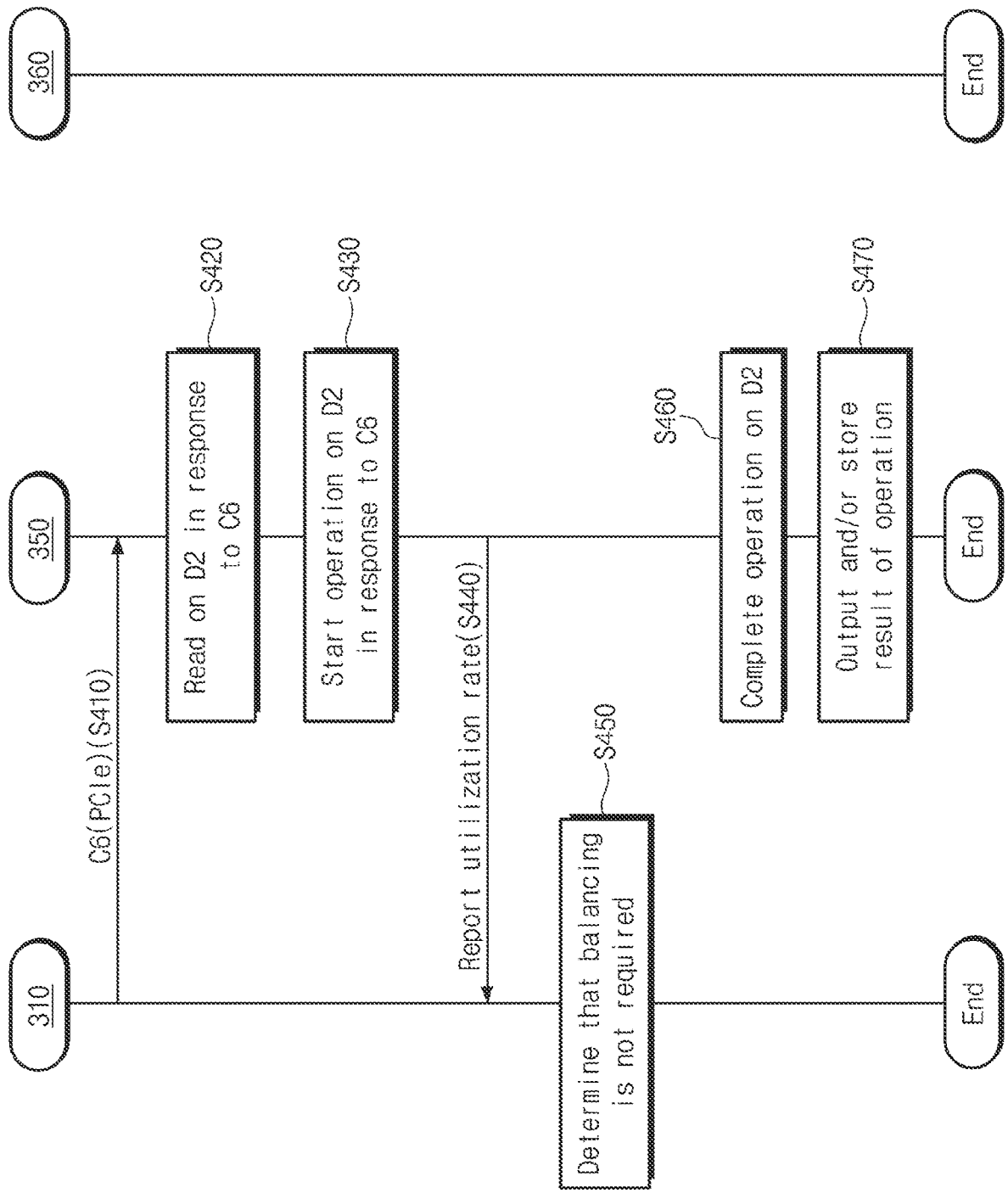
FIG. 9 illustrates a third example of an operating method of an electronic device.
Figure 10:
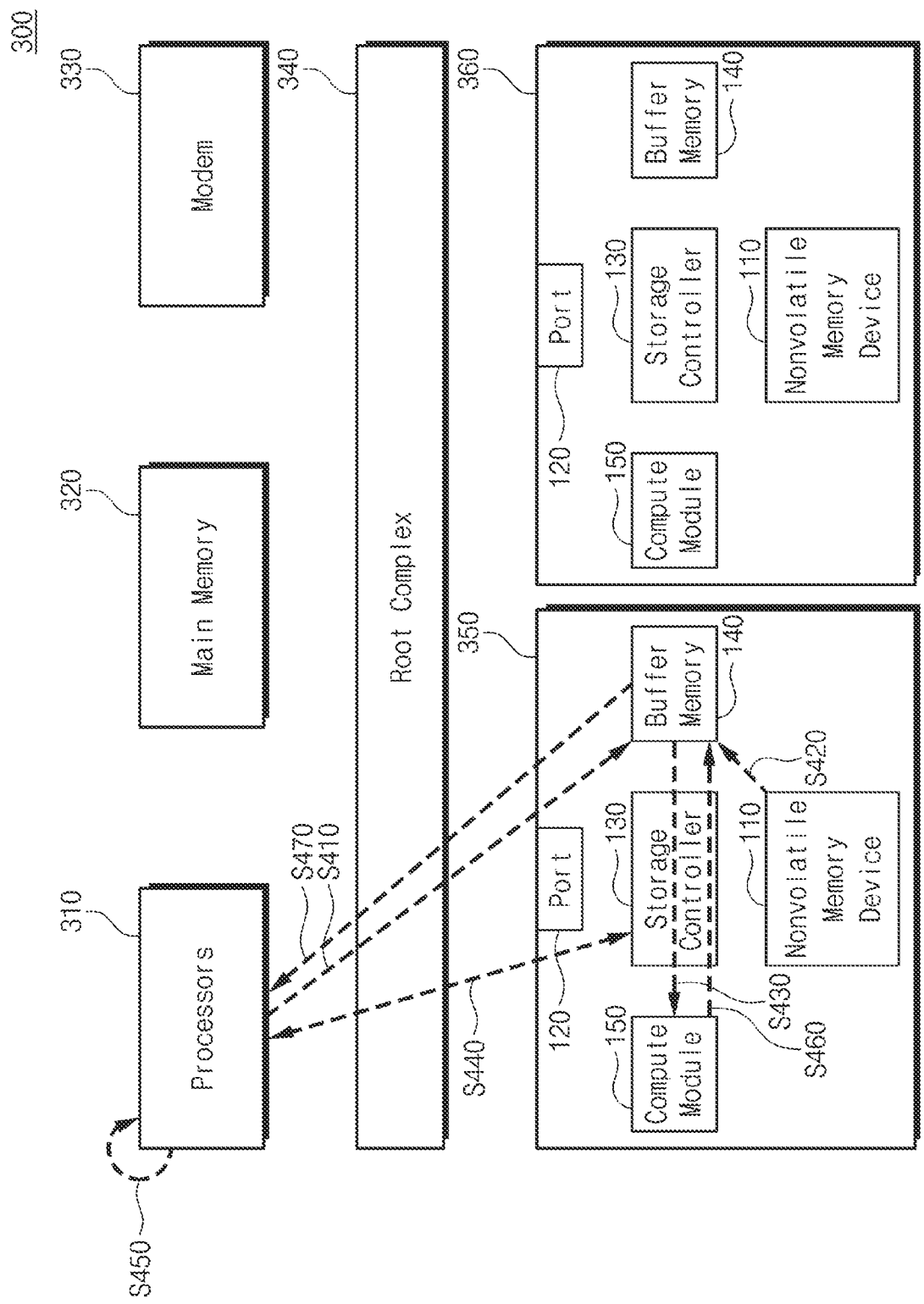
FIG. 10 illustrates an example of a process in which an operation according to the operating method of FIG. 9 is performed in an electronic device of FIG. 4.

FIG. 9 illustrates a third example of an operating method of the electronic device 300. FIG. 10 illustrates an example of a process in which an operation according to the operating method of FIG. 9 is performed in the electronic device 300 of FIG. 4. Referring to FIGS. 9 and 10, in operation S410, the first storage device 350 may receive a sixth command C6 from the processors 310. The sixth command C6 may have a first packet format, for example, a packet format of the PCIe©.

The sixth command C6 may be a read and/or operational command. The details of the operation that the sixth command C6 indicates may be defined by a detailed information field of the sixth command C6, such as an operation code opcode of the sixth command C6, a descriptor of the sixth command C6, and/or an argument of the sixth command C6. The sixth command C6 may be transferred to the storage controller 130 from the processors 310 through the root complex 340 and port 120.

In operation S420, the first storage device 350 may read second data D2 in response to the sixth command C6. For example, the storage controller 130 of the first storage device 350 may read the second data D2 from the nonvolatile memory device 110. The storage controller 130 may store (or load) the second data D2 thus read in (or onto) the buffer memory 140.

In operation S430, the first storage device 350 may start an operation (e.g., at least one computation/calculation/operation) associated with the second data D2 in response to the sixth command C6. The storage controller 130 may transfer the data stored in (or loaded onto) the buffer memory 140 to the compute module 150 based on the operation unit of the compute module 150. The compute module 150 may perform at least one operation indicated by the sixth command C6 with respect to the data of the operation unit transferred from the storage controller 130. The storage controller 130 may store (or load) a result of the operation performed by the compute module 150 in (or onto) the buffer memory 140.

The storage controller 130 may perform the operation on the second data D2 by repeating an operation of controlling the buffer memory 140 and the compute module 150 so as to repeat the following: 1) an operation of transferring, to the compute module 150, data corresponding to the operation unit from among the data loaded onto the buffer memory 140, 2) an operation of allowing the compute module 150 to perform an operation on (or to process) the data of the operation unit, and 3) an operation of storing (or loading) a result of the operation performed by the compute module 150 in (or onto) the buffer memory 140.

In operation S440, the first storage device 350 may report a utilization rate to the processors 310. For example, the storage controller 130 may monitor the utilization rate of the compute module 150. The storage controller 130 may report the utilization rate of the compute module 150 to the processors 310 through the port 120 and the root complex 340 (e.g., in the form of an interrupt), after the compute module 150 starts an operation, after the compute module 150 starts the operation and then a specific time period elapses, in response to that the compute module 150 starts the operation and a change of the utilization rate of the compute module 150 is saturated to a threshold value or less, and/or periodically based on a specific period (e.g., a time period).

Alternatively, the processors 310 request (or direct) the first storage device 350 to report the utilization rate of the compute module 150 through the root complex 340, by polling the utilization rate of the compute module 150 to the first storage device 350 after transmitting the sixth command C6 to the first storage device 350, after a specific time period elapses from the transmission of the sixth command C6 to the first storage device 350, and/or periodically based on a specific period (e.g., a time period).

In operation S450, the processors 310 may determine that balancing (e.g., balancing of an operation load) is not required. For example, the processors 310 may monitor the utilization rate(s) of the first storage device 350 and/or the second storage device 360 and may determine that balancing is not required, depending on a monitoring result. As it is determined that balancing is not required, the processors 310 may not request the balancing from the first storage device 350 and the second storage device 360.

In operation S460, the first storage device 350 may complete the operation associated with the second data D2. For example, the storage controller 130 of the first storage device 350 may complete the operation associated with the second data D2 by repeating the operation, which is based on the operation unit described with reference to operation S430, with respect to the data loaded onto the buffer memory 140.

In operation S470, the first storage device 350 may store and/or output a result of the operation. For example, the storage controller 130 of the first storage device 350 may output the operation result stored in (or loaded onto) the buffer memory 140 to the processors 310 through the port 120 and the root complex 340 (e.g., based on the first packet format PF1) and/or store the operation result in the nonvolatile memory device 110.

As operation S410 to operation S470 are performed, the process in which the processors 310 of the electronic device 300 delegate and process at least one computation/calculation/operation to the first storage device 350 may be completed.

Figure 11:
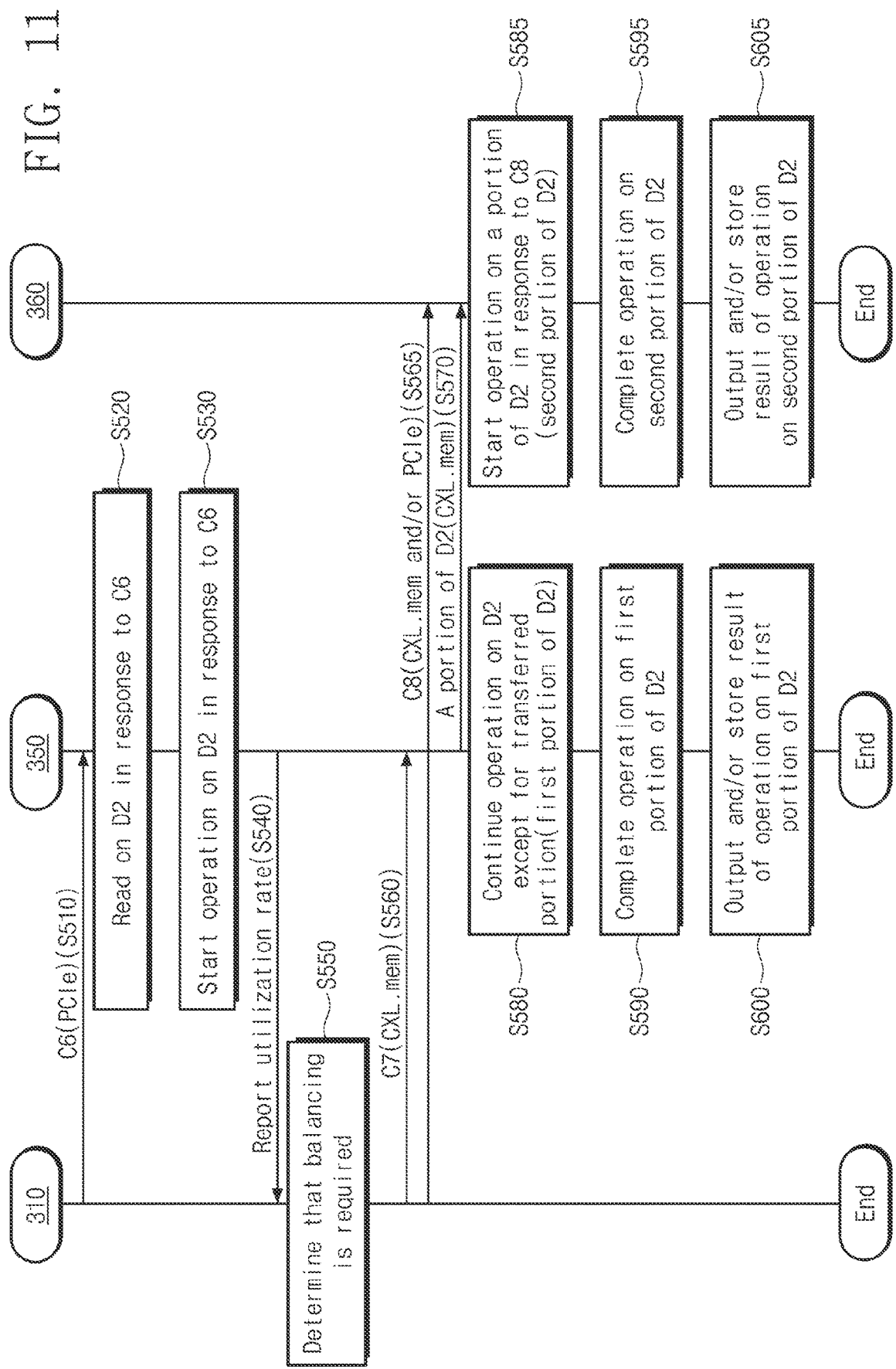
FIG. 11 illustrates a fourth example of an operating method of an electronic device.
Figure 12:
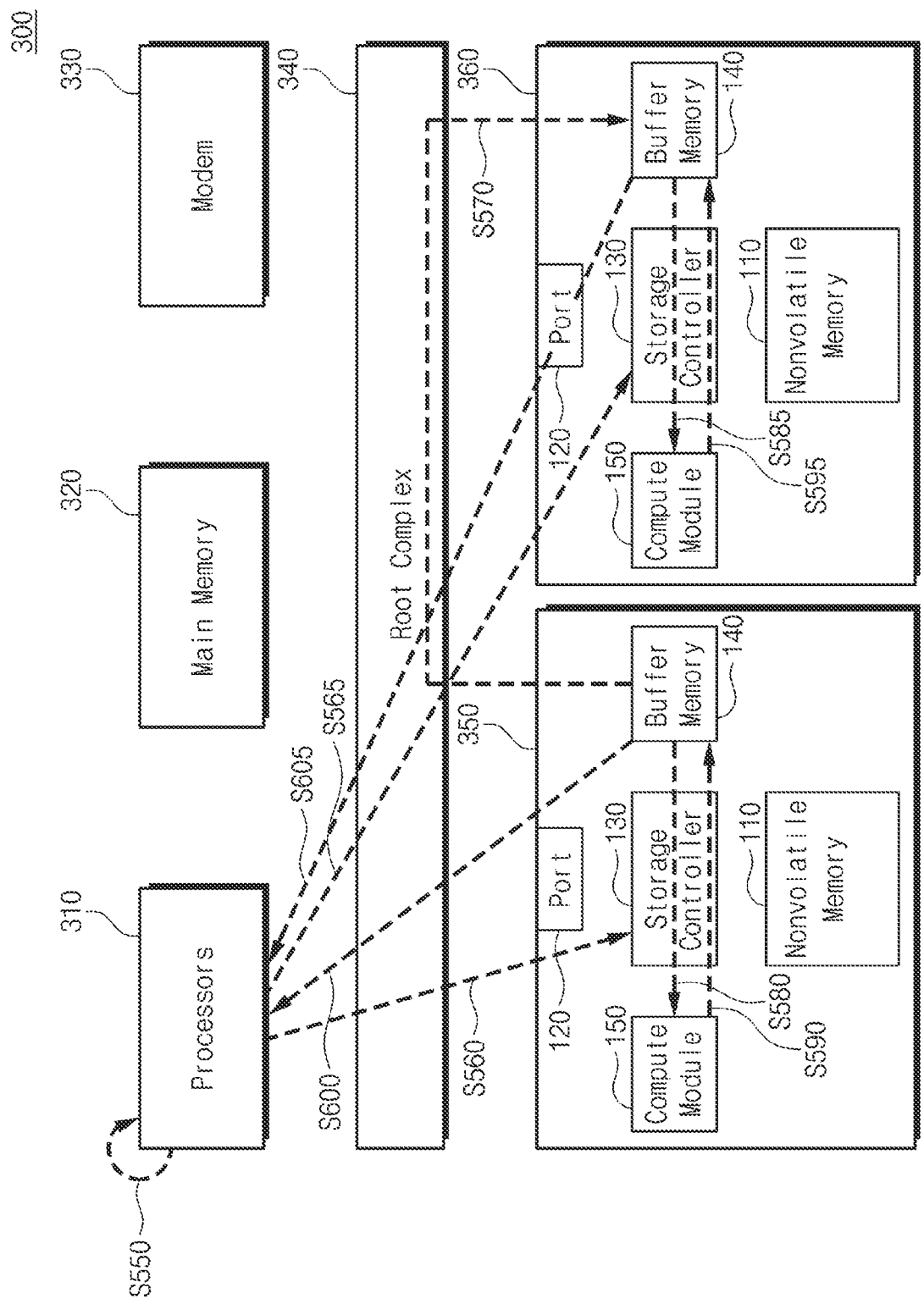
FIG. 12 illustrates an example of a process in which an operation according to the operating method of FIG. 11 is performed in an electronic device of FIG. 4.

FIG. 11 illustrates a fourth example of an operating method of the electronic device 300. FIG. 12 illustrates an example of a process in which an operation according to the operating method of FIG. 11 is performed in the electronic device 300 of FIG. 4. Referring to FIGS. 11 and 12, in operation S510, the first storage device 350 may receive the sixth command C6 from the processors 310. In operation S520, the first storage device 350 may read the second data D2 in response to the sixth command C6. In operation S530, the first storage device 350 may start an operation (e.g., at least one computation/calculation/operation) associated with the second data D2 in response to the sixth command C6. In operation S540, the first storage device 350 may report a utilization rate to the processors 310. Operation S510 to operation S540 may be performed to be the same as operation S410 to operation S440. Thus, additional description will be omitted to avoid redundancy.

In operation S550, the processors 310 may determine that balancing (e.g., balancing of an operation load) is required. For example, the processors 310 may monitor the utilization rate(s) of the first storage device 350 and/or the second storage device 360 and may determine that balancing is required, depending on a monitoring result.

If it is determined that the balancing is required, the processors 310 may request the balancing from the first storage device 350 and the second storage device 360. For example, in operation S560, the processors 310 may transmit, to the first storage device 350, a seventh command C7 having a second packet format, that is, the packet format of the CXL (or the packet format associated with "CXL.mem" from any of the packet formats of the CXL™). The seventh command C7 may be transferred to the storage controller 130 through the root complex 340 and the port 120. The seventh command C7 may include information for requesting (or directing) to transmit a segment of data (e.g., the second data D2) specified as a target of the operation corresponding to the sixth command C6 to the second storage device 360 through the root complex 340.

In operation S565, the processors 310 may transmit, to the second storage device 360, an eighth command C8 having the second packet format, that is, the packet format of the CXL™ (or the packet format associated with "CXL.mem" from any of the packet formats of the CXL™). The eighth command C8 may be transferred to the storage controller 130 through the root complex 340 and the port 120. The eighth command C8 may include information for requesting (or directing) to store (or load) the data transferred from the first storage device 350 through the root complex 340 in (onto) the buffer memory 140 of the second storage device 360.

In operation S570, the storage controller 130 of the first storage device 350 may transfer partial data, which are specified by the seventh command C7, from among the second data D2 loaded onto the buffer memory 140 to the root complex 340 through the port 120. For example, the partial data of the second data D2 may be transferred to the root complex 340 through at least one packet of the second packet format PF2. The root complex 340 may transfer the data packet of the second packet format PF2 transferred from the first storage device 350 to the second storage device 360. The storage controller 130 of the second storage device 360 may store (or load) the data included in the data packet received from the root complex 340 through port 120 in (or onto) the buffer memory 140.

In operation S580, the first storage device 350 may continue the operation, which is based on the operation unit, with respect to the remaining data of the second data D2 other than the transmitted partial data (or portion), for example, first partial data of the second data D2. In operation S585, the second storage device 360 may start the operation, which is based on the operation unit, with respect to the transmitted partial data (or portion) of the second data D2, for example, second partial data of the second data D2.

In operation S590, the first storage device 350 may complete the operation associated with the first partial data of the second data D2. For example, the storage controller 130 of the first storage device 350 may complete the operation associated with the first partial data by repeating the operation, which is based on the operation unit described with reference to operation S330, with respect to the first partial data loaded onto the buffer memory 140. In operation S595, the second storage device 360 may complete the operation associated with the second partial data of the second data D2. For example, the storage controller 130 of the second storage device 360 may complete the operation associated with the second partial data by repeating the operation, which is based on the operation unit described with reference to operation S330, with respect to the second partial data loaded onto the buffer memory 140.

In operation S600, the first storage device 350 may store and/or output a result of the operation associated with the first partial data. For example, the storage controller 130 of the first storage device 350 may output the operation result of the first partial data stored in (or loaded onto) the buffer memory 140 to the processors 310 through port 120 and the root complex 340 (e.g., based on the first packet format PF1) and/or store the operation result in the nonvolatile memory device 110.

In operation S605, the second storage device 360 may store and/or output a result of the operation associated with the second partial data. For example, the storage controller 130 of the second storage device 360 may output (or return) the operation result of the second partial data stored in (or loaded onto) the buffer memory 140 to processors 310 through the port 120 and the root complex 340 (e.g., based on the first packet format PF1) and/or to the first storage device 350 (e.g., through the second packet format PF2) and/or may store the operation result in the nonvolatile memory device 110.

As operation S510 to operation S605 are performed, the process in which the processors 310 of the electronic device 300 delegate, distribute, and process at least one computation/calculation/operation to the first storage device 350 and the second storage device 360 may be completed.

As described above, the second data D2 may be distributed into the first storage device 350 and the second storage device 360 through at least one packet of the second packet format PF2. Each of the first storage device 350 and the second storage device 360 may perform the operation with respect to data distributed thereto, and thus, balancing of the operation load may be performed. In the process of performing the balancing of the operation load, any other operation other than an operation of issuing the seventh command C7 and the eighth command C8 of the second packet format PF2 may not be requested from the processors 310. Accordingly, the first storage device 350 and the second storage device 360 may support a function of balancing and processing at least one computation/calculation/operation without causing the overhead of the processors 310.

In an exemplary embodiment, the description is given as the processors 310 allows the second storage device 360 to perform the balancing of the operation load by transmitting, to the second storage device 360, the eighth command C8 having the second packet format, that is, the packet format of the CXL™ (or the packet format associated with "CXL.mem" from any of the packet formats of the CXL™) in operation S565. However, the eighth command C8 may be a command causing the forwarding of the second partial data. The processors 310 may transfer an additional command of the first packet format PF1 and/or the second packet format PF2 to the second storage device 360. The additional command may be a command that allows the second storage device 360 to perform at least one operation with respect to the second partial data thus forwarded. The additional command may be transferred from the processors 310 to the second storage device 360 after operation S565, before operation S570, and/or after operation S570.

The examples in which tasks for an operation of the first storage device 350 are distributed (or balanced) and processed to the first storage device 350 and the second storage device 360 are described with reference to FIGS. 5 to 12. However, when the electronic device 300 further includes a third storage device, tasks for an operation of the first storage device 350 are distributed (or balanced) and processed by the second storage device 360 and the third storage device. That is, tasks for the operation delegated (or assigned) to one computational storage device may be balanced to two or more storage devices.

Figure 13:
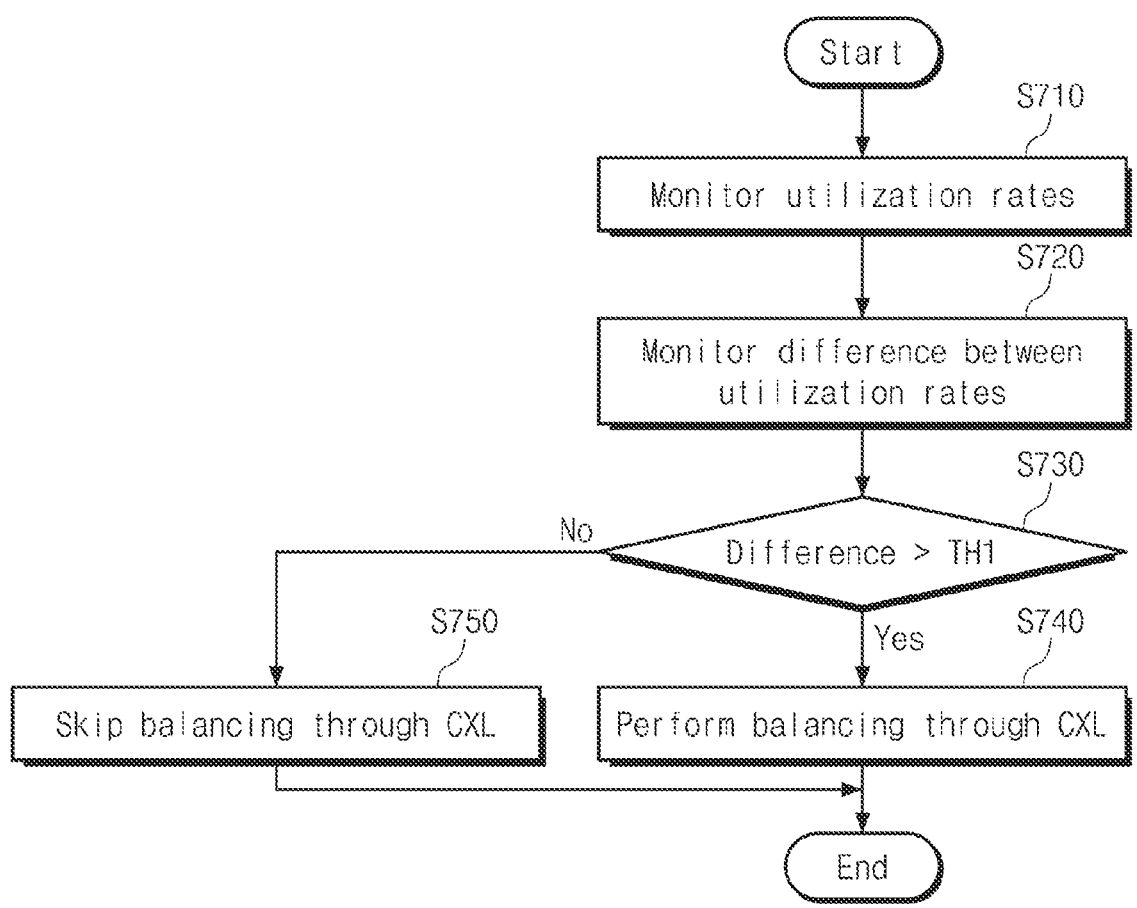
FIG. 13 illustrates an example of a process in which an electronic device determines whether balancing is required.

FIG. 13 illustrates an example of a process in which the electronic device 300 determines whether balancing is required. Referring to FIGS. 4 and 13, in operation S710, at least one of the processors 310 of the electronic device 300 may monitor utilization rates reported from the first storage device 350 and the second storage device 360.

In operation S720, the at least one of the processors 310 may monitor a difference between the utilization rates of storage devices (e.g., including the first storage device 350 and the second storage device 360) included in the electronic device 300. In an exemplary embodiment, the at least one of the processors 310 may monitor a difference between the highest utilization rate and the lowest utilization rate of the storage devices.

In operation S730, the at least one of the processors 310 may determine whether the difference between the utilization rates of the storage devices is greater than a first threshold value TH1. When the difference between the utilization rates of the storage devices is greater than the first threshold value TH1, in operation S740, the at least one of the processors 310 may determine that balancing between the storage devices, of which the difference of the utilization rates is greater than the first threshold value TH1, is required and may perform (or direct or request) balancing through the CXL™. Alternatively, the at least one of the processors 310 may determine that there is a need to balance (or distribute and process) tasks of the storage device corresponding to the highest utilization rate by at least two storage devices corresponding to the lowest utilization rate.

When the difference between the utilization rates of the storage devices is not greater than the first threshold value TH1 (or is the first threshold value TH1 or less), in operation S750, the at least one of the processors 310 may determine that balancing between the storage devices (hereinafter referred to as "selected storage devices"), of which the difference of the utilization rates is not greater than the first threshold value TH1, is not required and may skip balancing through the CXL™.

In an exemplary embodiment, the first threshold value TH1 may be defined by a ratio (e.g., 30%) of a maximum operation workload that the compute module 150 is capable of processing. In an exemplary embodiment, the at least one of the processors 310 may determine a workload to be balanced (or distributed and processed) between the selected storage devices. For example, the at least one of the processors 310 may determine a workload to be balanced (or distributed and processed), based on a utilization rate of each of the selected storage devices, the amount of tasks to be balanced (or distributed and processed), and/or a traffic resource (e.g., free resource) amount (or ratio) of the root complex 340.

As another example, the at least one of the processors 310 may be implemented to balance (or distribute and process) a task of a storage device corresponding to the highest utilization rate to at least one storage device (e.g., at least one storage device corresponding to the lowest utilization rate), in response to the highest utilization rate that is higher than a specific threshold value, instead of the difference between the utilization rates.

Figure 14:
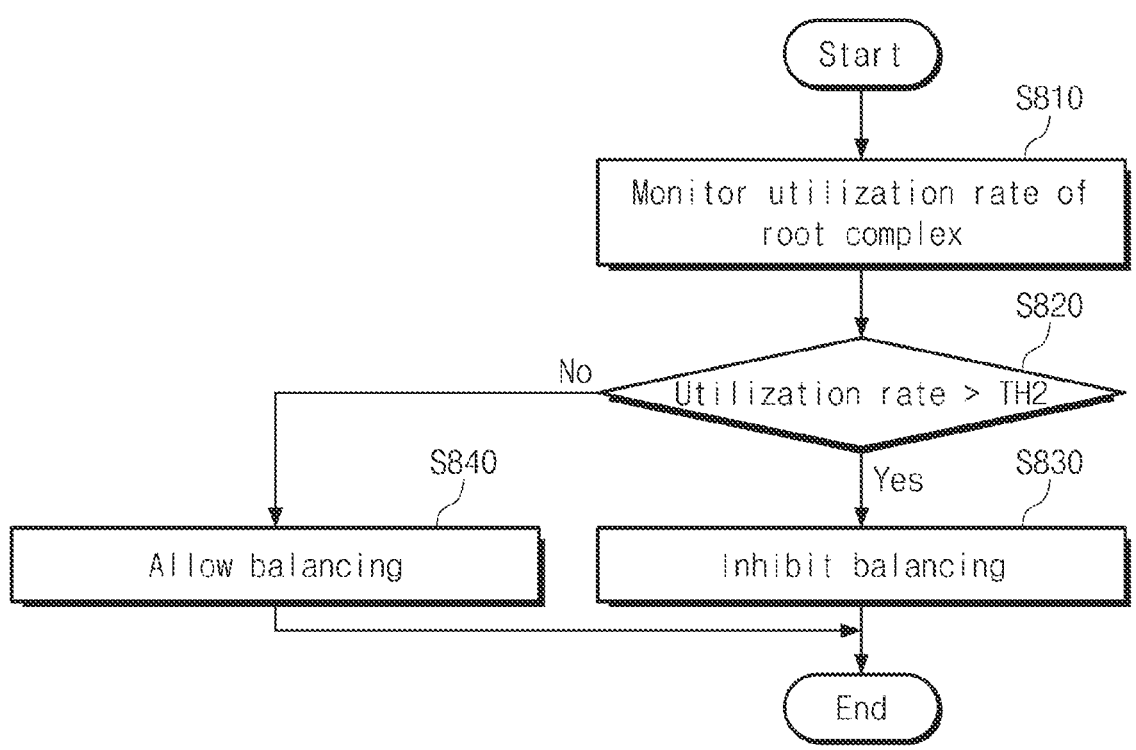
FIG. 14 illustrates an example of a process in which an electronic device determines whether to inhibit balancing.

FIG. 14 illustrates an example of a process in which the electronic device 300 determines whether to inhibit balancing. Referring to FIGS. 4 and 14, in operation S810, at least one of the processors 310 may monitor a utilization rate (e.g., a traffic utilization rate) of the root complex 340.

In operation S820, the at least one of the processors 310 may determine whether the utilization rate of the root complex 340 is greater than a second threshold value TH2. In an exemplary embodiment, the second threshold value TH2 may be defined by a ratio (e.g., 70%) of the whole traffic of the root complex 340.

When the utilization rate of the root complex 340 is greater than the second threshold value TH2, in operation S830, the at least one of the processors 310 may inhibit balancing between storage devices through the CXL™. When the utilization rate of the root complex 340 is not greater than the second threshold value TH2 (or is the second threshold value TH2 or less), in operation S840, the at least one of the processors 310 may allow balancing.

As described above, the at least one of the processors 310 of the electronic device 300 may inhibit balancing between storage devices, for example, balancing through the root complex 340 when the traffic of the root complex 340 is expected to be insufficient. Accordingly, balancing between storage devices may be prevented to avoid reducing the performance of the electronic device 300.

Figure 15:
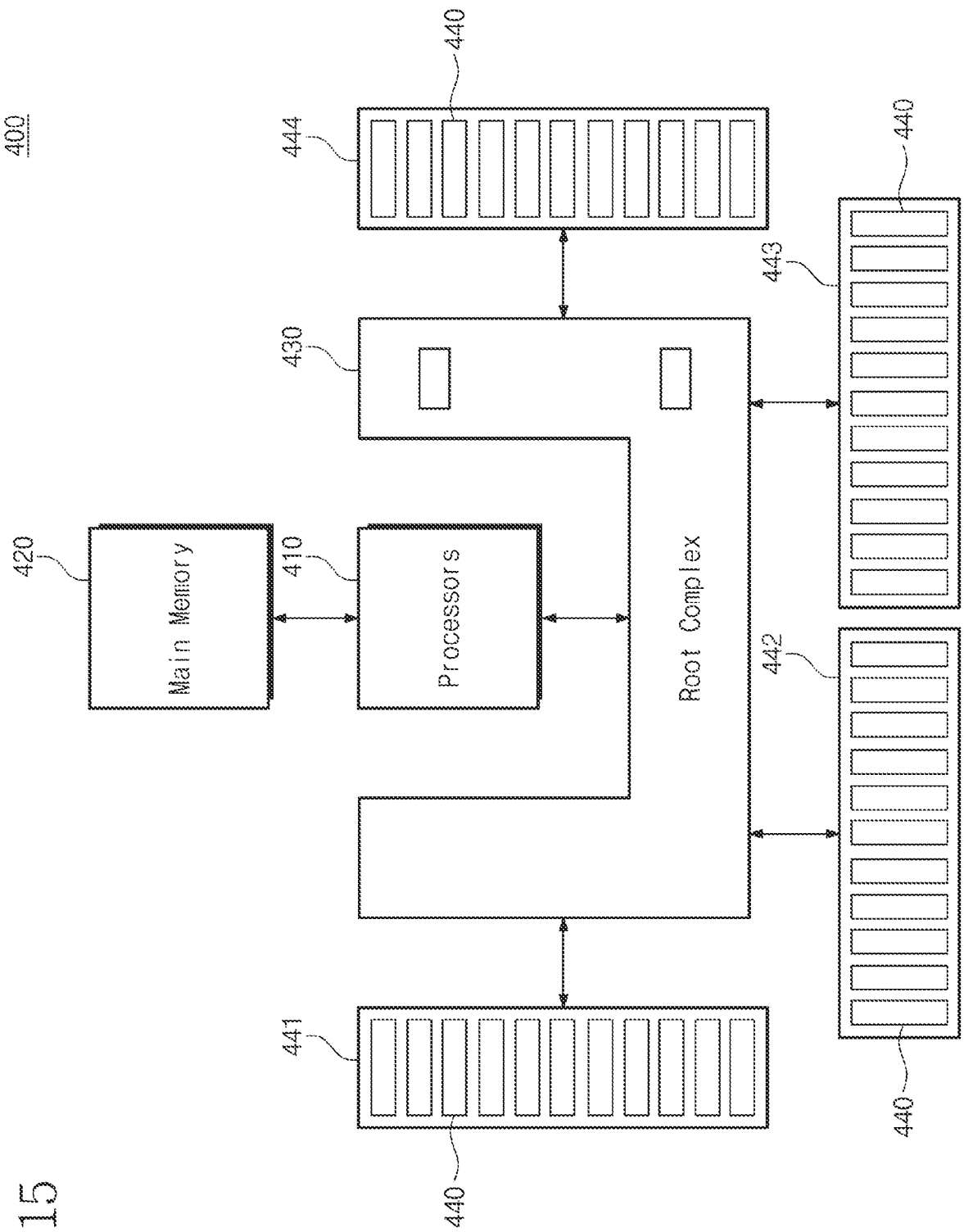
FIG. 15 illustrates an electronic device according to another exemplary embodiment of the present disclosure.

FIG. 15 illustrates an electronic device 400 according to another embodiment of the present disclosure. Referring to FIG. 15, the electronic device 400 may include processors 410, a main memory 420, a root complex 430, and storage devices 440.

The processors 410, the main memory 420, and the root complex 430 may correspond to the processors 310, the main memory 320, and the root complex 340 of FIG. 4, respectively. Each of the storage devices 440 may correspond to the storage device 100 of FIG. 1.

Although not illustrated to avoid drawings from being unnecessarily complicated, as described with reference to FIG. 4, components such as the modem 330 may be further included in the electronic device 400.

The storage devices 440 may be classified as belonging to a first zone 441, a second zone 442, a third zone 443, and a fourth zone 444. For example, the first zone 441, the second zone 442, the third zone 443, and the fourth zone 444 may be determined based on a physical distance of a transmission path in the root complex 430.

For example, the root complex 430 may be implemented based on PCIe© Gen.5. In a signal that is based on the PCIe© Gen.5, a signal loss according to a physical length of a transmission path may be greater than a signal loss of any other generation. Accordingly, at least one of the processors 410 may classify the storage devices 440 into the first zone 441, the second zone 442, the third zone 443, and the fourth zone 444 such that a signal loss resulting from balancing of an operation load of the storage devices 440 does not cause the attenuation of the signal (i.e., such that storage devices having a distance not causing the attenuation of the signal belong to the same zone).

The at least one of the processors 410 may allow balancing (or distributing and processing) of an operation load between the storage devices 440 belonging to the same zone. The at least one of the processors 410 may inhibit balancing (or distributing and processing) of an operation load between storage devices belonging to different zones. Accordingly, signals (e.g., data) may be prevented from attenuation due to the operation load balancing between storage devices.

Figure 16:
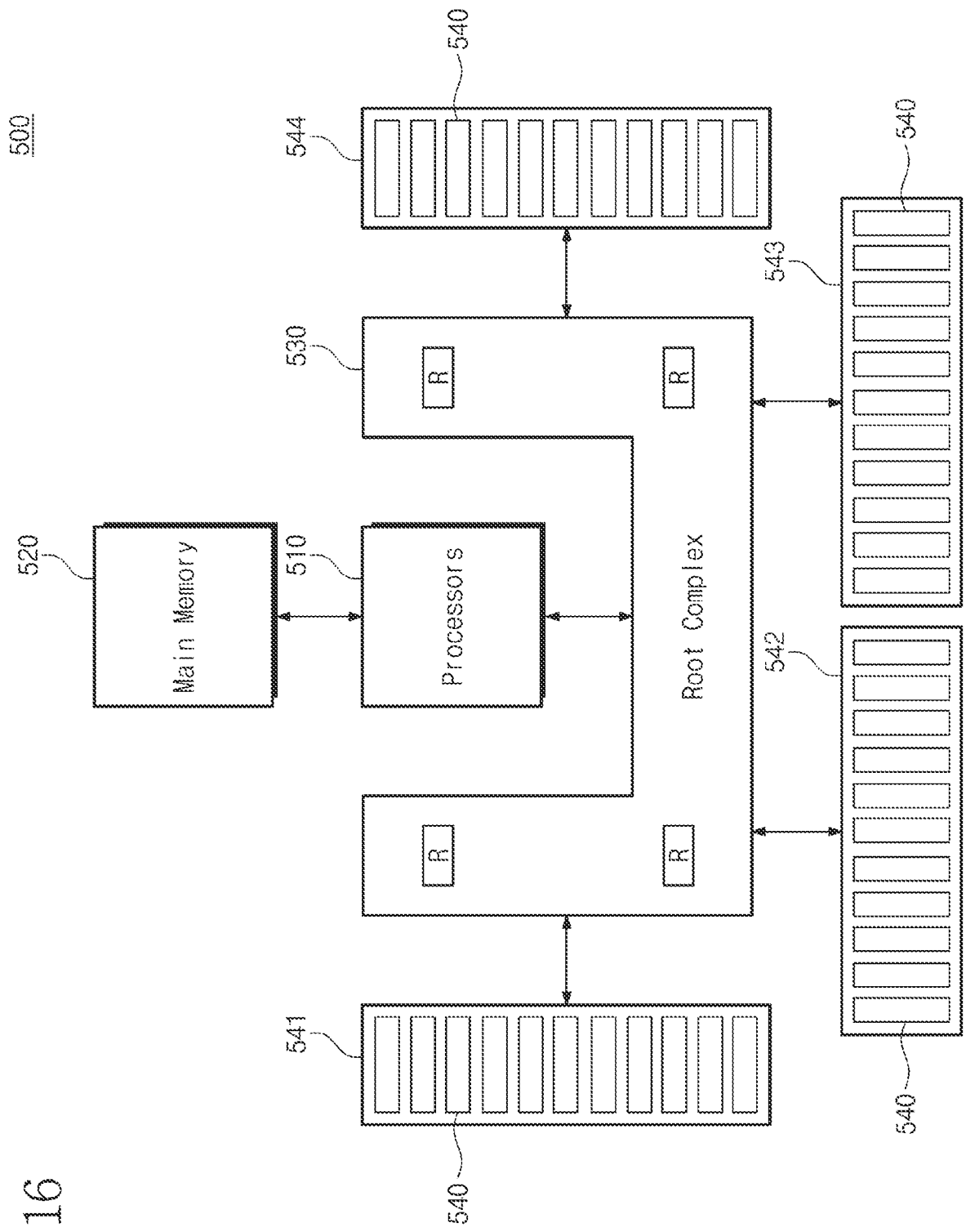
FIG. 16 illustrates an electronic device according to another exemplary embodiment of the present disclosure.

FIG. 16 illustrates an electronic device 500 according to an exemplary embodiment of the present disclosure. Referring to FIG. 16, the electronic device 500 may include processors 510, a main memory 520, a root complex 530, and storage devices 540.

The processors 510, the main memory 520, and the root complex 530 may correspond to the processors 310, the main memory 320, and the root complex 340 of FIG. 4, respectively. Each of the storage devices 540 may correspond to the storage device 100 of FIG. 1.

Although not illustrated to avoid drawings from being unnecessarily complicated, as described with reference to FIG. 4, components such as the modem 330 may be further included in the electronic device 500.

The storage devices 540 may be classified as belonging to a first zone 541, a second zone 542, a third zone 543, and a fourth zone 544. For example, as described with reference to FIG. 15, the first zone 541, the second zone 542, the third zone 543, and the fourth zone 544 may be determined based on a physical distance of a transmission path in the root complex 530.

Compared with the root complex 430 of FIG. 15, the root complex 530 may include retimers "R". Each of the retimers "R" may recover the entirety of a waveform of a signal and an attenuation of the signal by realigning the waveform of the signal. For example, the retimers "R" may be provided at locations corresponding to boundaries of different zones from among transmission paths in the root complex 530. The electronic device 500 may allow balancing between different zones by including the retimers "R".

Figure 17:
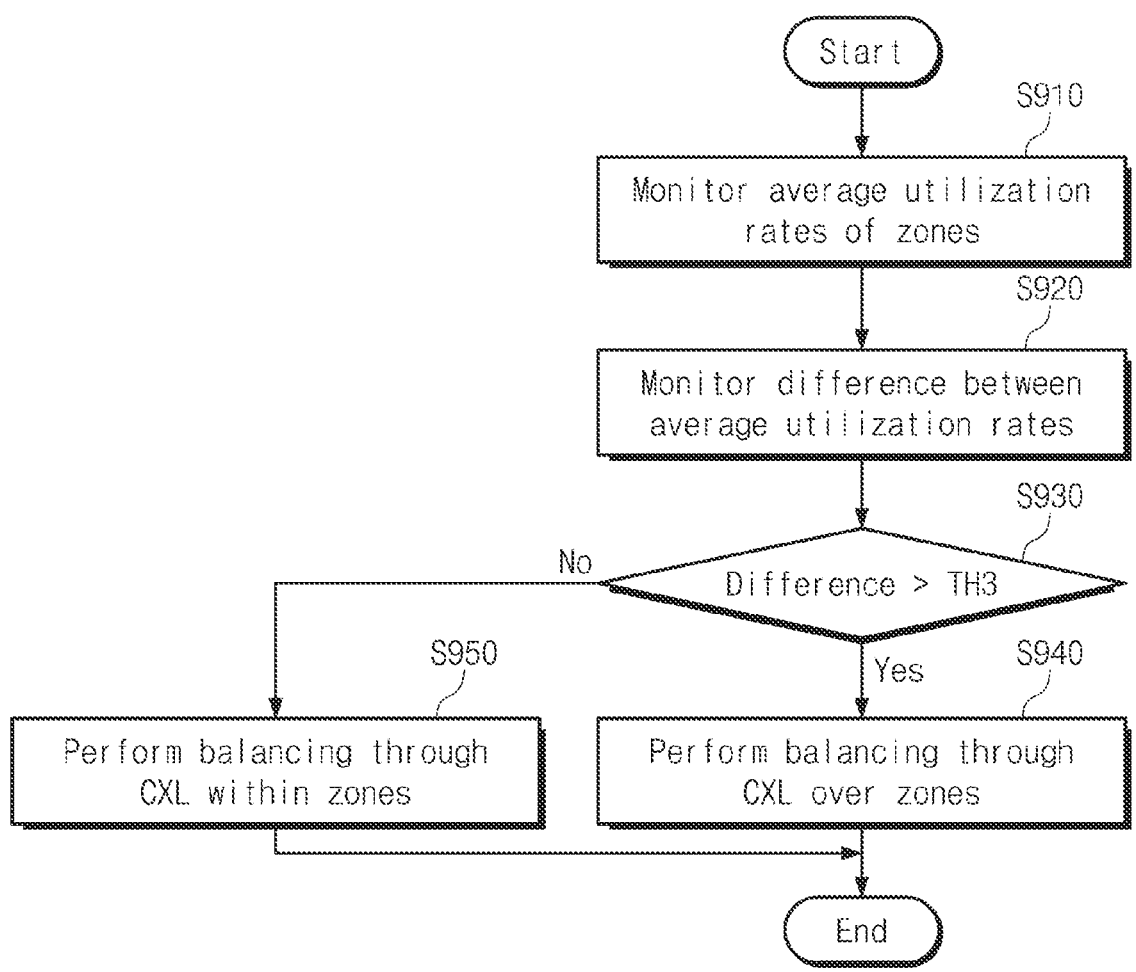
FIG. 17 illustrates an example in which an electronic device performs balancing between different zones.

FIG. 17 illustrates an example in which the electronic device 500 performs balancing between different zones. Referring to FIGS. 16 and 17, in operation S910, at least one of the processors 510 of the electronic device 500 may monitor average utilization rates of zones. In operation S920, the at least one of the processors 510 may monitor a difference between average utilization rates, for example, a difference between the highest utilization rate and the lowest utilization rate.

In operation S930, the at least one of the processors 510 may determine whether the difference between the average utilization rates is greater than a third threshold value TH3. When the difference between the average utilization rates is greater than the third threshold value TH3, in operation S940, the at least one of the processors 510 may perform balancing through the CXL™ between zones, of which a difference between average utilization rates is greater than the third threshold value TH3.

When the difference between the average utilization rates is not greater than the third threshold value TH3 (or is the third threshold value TH3 or less), in operation S950, the at least one of the processors 510 may perform balancing through the CXL™ within a zone and may inhibit the balancing through the CXL™ between zones.

Figure 18:
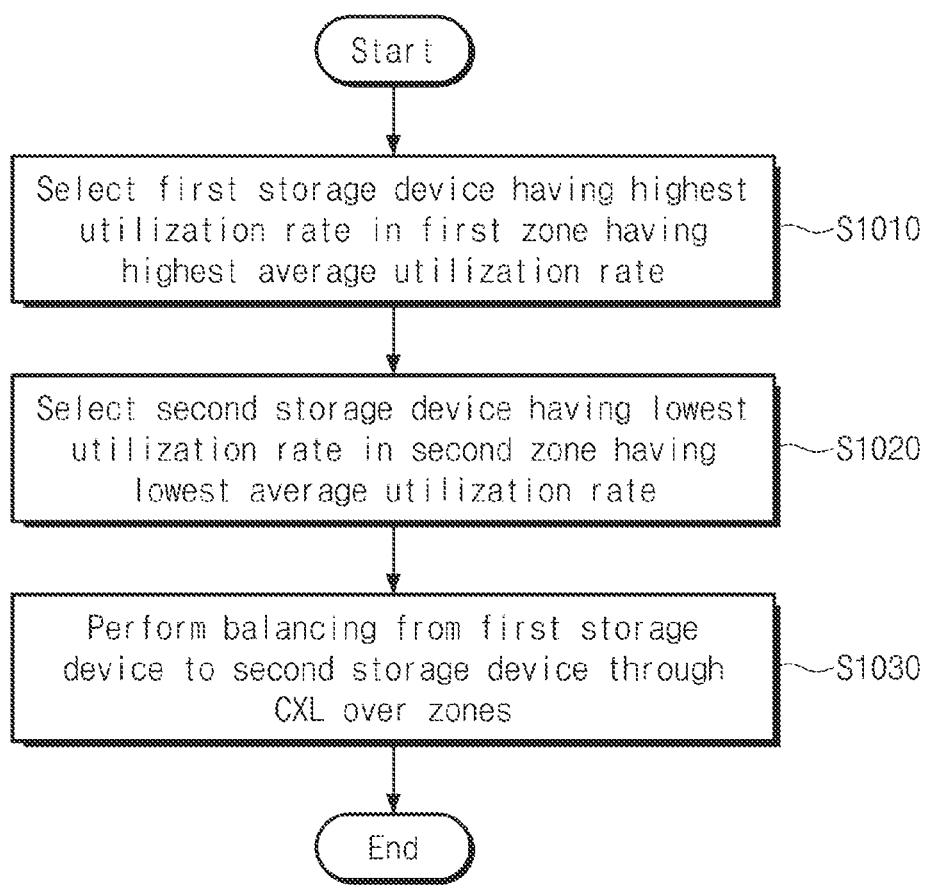
FIG. 18 illustrates an example of a process in which an electronic device performs balancing in different zones.

FIG. 18 illustrates an example of a process in which the electronic device 500 performs balancing in different zones. Referring to FIGS. 16 and 18, an average utilization rate of the first zone 441 of the first zone 441, the second zone 442, the third zone 443, and the fourth zone 444 is the highest and an average utilization rate of the second zone 442 thereof is the lowest.

In operation S1010, at least one of the processors 510 may select a first storage device having the highest utilization rate from the first zone 441 having the highest average utilization rate. In operation S1020, the at least one of the processors 510 may select a second storage device having the lowest utilization rate from the second zone 442 having the lowest average utilization rate. In operation S1030, the at least one of the processors 510 may perform balancing from the first storage device to the second storage device through the CXL™, that is, balancing between zones through the CXL™.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not imply an order or a numerical meaning of any form.

In the above described exemplary embodiments, components according to the aforementioned exemplary embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits claimed as intellectual property (IP).

According to exemplary embodiments of the present disclosure, a storage device may access a nonvolatile memory device through a buffer memory in response to a command of a first packet format and may access the buffer memory without accessing the nonvolatile memory device in response to a command of a second packet format. Accordingly, a storage device supporting balancing of tasks associated with data of the buffer memory, an electronic device including the storage device, and an operating method of the electronic device are provided.

While the present disclosure has been described with reference to exemplary embodiments thereof, it will be apparent to those of skill in the art, that various changes and modifications may be made thereto without departing from the spirit and scope of the present disclosure as set forth in the following claims.

What is claimed is:

1. A storage device comprising:
a nonvolatile memory device;
a buffer memory;
a compute module configured to perform at least one operation;
a port configured to be connected with an external device; and
a storage controller configured to
in response to receiving first data and a first command from the external device through the port, the first command corresponding to a first packet format, access the nonvolatile memory device by using the buffer memory, and load the first data onto the buffer memory as second data,
wherein the compute module is configured to perform the at least one operation with respect to the second data in response to the first command, and
in response to receiving a second command from the external device through the port, the second command corresponding to a second packet format, access the buffer memory without accessing the nonvolatile memory device, and output third data, including a segment of the second data, to the external device through the port.

2. The storage device of claim 1, wherein the first packet format corresponds to Peripheral Component Interconnect (PCIE) or (Non-Volatile Memory express (NVMe), and the second packet format corresponds to Compute eXpress Link (CXL).

3. The storage device of claim 1, wherein the storage controller is configured to, in response to receiving the second command corresponding to the second packet format, output data stored in the buffer memory to the external device through the port.

4. The storage device of claim 1, wherein the storage controller is configured to, in response to receiving the second command corresponding to the second packet format, store data received from the external device through the port in the buffer memory.

5. The storage device of claim 1, wherein the compute module includes at least one of an encryption and decryption unit, a compressor and decompressor, a neural processor, a neuromorphic processor, a graphics processing unit (GPU), an image processor, a digital signal processor (DSP), an application specific integrated circuit (ASIC), a field programmable gate array (FPGA), a multiplier, an adder, a multiplier and accumulator (MAC), a floating point unit (FPU), a database filter, a quantizer, or a normalizer.

6. The storage device of claim 1, wherein the computer module is configured to, in response to the second command corresponding to the second packet format perform the at least one operation with respect to fourth data including a remaining segment of the second data other than the third data.

7. The storage device of claim 6, wherein the compute module is configured to perform at least one of
storing a result of the at least one operation performed with respect to the fourth data in the nonvolatile memory device, or
outputting the result to the external device.

8. The storage device of claim 6, wherein the compute module is configured to receive a result of the at least one operation performed with respect to the third data from the external device.

9. The storage device of claim 1, wherein the storage controller is configured to, in response to receiving a third command from the external device through the port, the third command corresponding to the first packet format, read sixth data from the nonvolatile memory device for loading onto the buffer memory.

10. The storage device of claim 1, wherein the storage controller is configured to, in response to receiving seventh data and a third command from the external device through the port, the third command corresponding to the second packet format, load the seventh data onto the buffer memory.

11. The storage device of claim 10,
wherein the storage controller is configured to perform the at least one operation with respect to the seventh data in response to at least one of
the third command, or
a fourth command received from the external device through the port, the fourth command corresponding to the first packet format.

12. An electronic device comprising:
at least one processor;
a first storage device and a second storage device each including a buffer memory and a nonvolatile memory device; and
a root complex configured to electrically connect the at least one processor, the first storage device, and the second storage device,
wherein each of the first storage device and the second storage device is configured to, in response to receiving a first command of a first packet format from the at least one processor through the root complex, access the nonvolatile memory device by using the buffer memory,
wherein the first storage device is configured to, in response to receiving a second command of a second packet format from the at least one processor through the root complex, transfer second data, including a segment of first data loaded onto the buffer memory of the first storage device, to the buffer memory of the second storage device, the second data transferred through the root complex without passing through the at least one processor.

13. The electronic device of claim 12, wherein each of the first storage device and the second storage device further includes a compute module,
wherein the first storage device is configured to perform at least one operation with respect to third data including a remaining segment of the first data other than the second data by using the compute module of the first storage device, and
wherein the second storage device is configured to perform the at least one operation with respect to the second data by using the compute module of the second storage device.

14. An operating method of an electronic device which includes at least one processor, a first storage device, a second storage device, and a root complex, the method comprising:
assigning, at the at least one processor, a first task and a second task to the first storage device and the second storage device through the root complex based on a first packet format, respectively;
monitoring, with the at least one processor, a computational utilization rate of the first storage device and a computational utilization rate of the second storage device through the root complex;
when a difference between the computational utilization rate of the first storage device and the computational utilization rate of the second storage device is greater than a first threshold value, instructing, by the at least one processor, to balance the first storage device and the second storage device through the root complex based on a second packet format; and
performing, at the first storage device and the second storage device, a balancing through the root complex without passing through the at least one processor.

15. The method of claim 14, further comprising:
inhibiting, by the at least one processor, the balancing between the first storage device and the second storage device, when a traffic utilization rate of the root complex is greater than a second threshold value and/or when a distance between the first storage device and the second storage device is greater than a third threshold value.

* * * * *